US011922735B2

(12) United States Patent
Hashimoto et al.

(10) Patent No.: US 11,922,735 B2
(45) Date of Patent: Mar. 5, 2024

(54) VEHICLE CONTROLLER, VEHICLE CONTROL METHOD, AND NON-TRANSITORY COMPUTER READABLE MEDIUM STORING VEHICLE CONTROL PROGRAM

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 412 days.

(21) Appl. No.: 17/136,253

(22) Filed: Dec. 29, 2020

(65) Prior Publication Data

US 2021/0217254 A1 Jul. 15, 2021

(30) Foreign Application Priority Data

Jan. 9, 2020 (JP) ................................ 2020-002013

(51) Int. Cl.
*G07C 5/00* (2006.01)
*G07C 5/02* (2006.01)
*G07C 5/08* (2006.01)

(52) U.S. Cl.
CPC ............... *G07C 5/008* (2013.01); *G07C 5/02* (2013.01); *G07C 5/0808* (2013.01); *G07C 5/0816* (2013.01)

(58) Field of Classification Search
CPC ........ G07C 5/008; G07C 5/02; G07C 5/0808; G07C 5/0816; G05B 19/0423; G05B 2219/25257
See application file for complete search history.

(56) References Cited

U.S. PATENT DOCUMENTS

2015/0127191 A1* 5/2015 Misra .................... G08G 1/056 701/1
2015/0279125 A1* 10/2015 Chronowski .......... G07C 5/008 701/29.2
(Continued)

FOREIGN PATENT DOCUMENTS

JP 2009-31873 A 2/2009
JP 2010-186413 A 8/2010
(Continued)

*Primary Examiner* — Fadey S. Jabr
*Assistant Examiner* — Jacob Todd Chappell
(74) *Attorney, Agent, or Firm* — Oblon, McClelland, Maier & Neustadt, L.L.P.

(57) ABSTRACT

A vehicle controller is used for a first vehicle and includes processing circuitry. The processing circuitry is configured to execute an index deriving process that derives a traveling performance index of the first vehicle, the traveling performance index being an index related to a traveling performance, an index receiving process that receives the traveling performance index of a second vehicle from the second vehicle through vehicle-to-vehicle communication, and a performance determination process that compares the traveling performance index of the second vehicle with the traveling performance index of the first vehicle to determine whether a traveling performance of the first vehicle is lower than a traveling performance of the second vehicle.

15 Claims, 7 Drawing Sheets

(56) References Cited

U.S. PATENT DOCUMENTS

| | | | | |
|---|---|---|---|---|
| 2017/0298854 | A1 | 10/2017 | Kato et al. | |
| 2018/0218609 | A1* | 8/2018 | Sharma | G08G 1/0965 |
| 2018/0290644 | A1* | 10/2018 | Jang | B60K 28/16 |
| 2019/0049958 | A1* | 2/2019 | Liu | G01S 17/00 |
| 2021/0097783 | A1* | 4/2021 | Soltani Bozchalooi | G05D 1/0094 |

FOREIGN PATENT DOCUMENTS

| | | | |
|---|---|---|---|
| JP | 2013-3857 | A | 1/2013 |
| JP | 2016-6327 | A | 1/2016 |
| JP | 2017-194048 | A | 10/2017 |

* cited by examiner

VEHICLE CONTROLLER, VEHICLE CONTROL METHOD, AND NON-TRANSITORY COMPUTER READABLE MEDIUM STORING VEHICLE CONTROL PROGRAM

BACKGROUND

1. Field

The following description relates to a vehicle controller, a vehicle control method, and a non-transitory computer readable medium configured to store a vehicle control program.

2. Description of Related Art

Japanese Laid-Open Patent Publication No. 2017-194048 discloses an example of a vehicle controller that functions to conduct an abnormality diagnosis of an internal combustion engine. When the driver is operating the accelerator pedal, the controller measures duration of a state in which the operation amount of the accelerator pedal is greater than or equal to a first predetermined amount and the ratio of an actual output torque of the internal combustion engine to a request torque is less than a predetermined value. When the duration is greater than a predetermined time and the operation amount of the accelerator pedal is greater than or equal to a second predetermined amount that is greater than the first predetermined amount, the internal combustion engine is diagnosed as having an abnormality.

Various threshold values used in abnormality diagnosis such as those described above, that is, the first predetermined amount and the second predetermined amount, are set in advance.

Typically, these threshold values are fixed based on the assumption that the vehicle travels in various environments. Threshold values determined in such a manner may not be optimal for the traveling environment of the vehicle when the threshold values are used in the abnormality diagnosis. When these threshold values are used in abnormality diagnosis, the result of the abnormality diagnosis may disregard the traveling environment of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure and their operation and advantages are as follows.

Aspect 1. An aspect of the present disclosure provides a vehicle controller used for a first vehicle. The first vehicle is configured to directly perform vehicle-to-vehicle communication with a second vehicle. The vehicle controller includes processing circuitry. The processing circuitry is configured to execute an index deriving process that derives a traveling performance index of the first vehicle, the traveling performance index being an index related to a traveling performance, an index receiving process that receives the traveling performance index of the second vehicle from the second vehicle through the vehicle-to-vehicle communication, and a performance determination process that compares the traveling performance index of the second vehicle with the traveling performance index of the first vehicle to determine whether a traveling performance of the first vehicle is lower than a traveling performance of the second vehicle.

Vehicle-to-vehicle communication is wireless communication performed between vehicles traveling in proximity to each other. That is, the second vehicle configured to perform vehicle-to-vehicle communication with the first vehicle is traveling in proximity to the first vehicle. That is, it may be assumed that two vehicles that perform vehicle-to-vehicle communication with each other are traveling in the same traveling environment. In the configuration described above, the first vehicle receives the traveling performance index of the second vehicle from the second vehicle through vehicle-to-vehicle communication. The received traveling performance index of the second vehicle is compared with the traveling performance index of the first vehicle to determine whether the traveling performance of the first vehicle is lower than the traveling performance of the second vehicle. When the traveling performance index of the second vehicle and the traveling performance index of the first vehicle are compared in the same traveling environment as described above, the determination is made taking into consideration the traveling environment of the vehicles.

Aspect 2. The vehicle controller according to aspect 1 may further include a storage device configured to store relationship specifying data that specifies a relationship between a state of a vehicle and an action variable. The state of the vehicle affects a traveling performance of a vehicle indicated by the traveling performance index. The action variable is a variable related to operation of an electronic device of the vehicle. The processing circuitry may be configured to execute an obtaining process that obtains a detection value of a sensor configured to detect the state of the vehicle, an operating process that operates the electronic device based on a value of the action variable that is determined by the detection value and the relationship specifying data, a reward calculation process that assigns a greater reward when the detection value indicates that the traveling performance of the first vehicle is higher than a reference performance than when the detection value indicates that the traveling performance of the first vehicle is not higher than the reference performance, and an updating process that updates the relationship specifying data using the detection value, the value of the action variable used for operation of the electronic device, and the reward corresponding to the operation as inputs to a predetermined update mapping. The update mapping may be configured to output the relationship specifying data that is updated so that an expected return of the reward is increased when the electronic device is operated in accordance with the relationship specifying data. The processing circuitry may be configured in the reward calculation process to set a reward assigned for a value indicating that the traveling performance of the first vehicle is higher than the reference performance to a greater value when the performance determination process determines that the traveling performance of the first vehicle is lower than the traveling performance of the second vehicle than when the performance determination process determines that the traveling performance of the first vehicle is not lower than the traveling performance of the second vehicle.

This configuration calculates a reward corresponding to operation of the electronic device to acknowledge the type of reward obtained by the operation. Based on the reward, the relationship specifying data is updated by the update mapping in accordance with reinforcement learning. Thus, the relationship between the state of the vehicle and the action variable is appropriately set during traveling of the vehicle. Thus, the relationship between the state of the vehicle and the action variable is adjusted while the vehicle travels.

When it is determined that the traveling performance of the first vehicle is lower than the traveling performance of the second vehicle based on a comparison of the traveling performance index of the second vehicle with the traveling performance index of the first vehicle, there is a possibility that adjustment of the relationship between the state of the vehicle and the action variable is delayed in the first vehicle as compared to the second vehicle. In the configuration described above, when it is determined that the traveling performance of the first vehicle is lower than the traveling performance of the second vehicle, the reward assigned for the traveling performance of the first vehicle being higher than the reference performance is set to a greater value than when it is determined that the traveling performance of the first vehicle is not lower than the traveling performance of the second vehicle. In this configuration, when there is a possibility that adjustment of the relationship between the state of the vehicle and the action variable is delayed in the first vehicle as compared to the second vehicle, the update speed of the relationship specifying data is increased, so that the relationship is adjusted at an earlier time. As a result, the traveling performance of the first vehicle is improved.

Aspect 3. The vehicle controller according to aspect 1 may further include a storage device configured to store relationship specifying data that specifies a relationship between a state of a vehicle and an action variable. The state of the vehicle affects a traveling performance of a vehicle indicated by the traveling performance index. The action variable is a variable related to operation of an electronic device of the vehicle. The processing circuitry may be configured to execute an obtaining process that obtains a detection value of a sensor configured to detect the state of the vehicle, an operating process that operates the electronic device based on a value of the action variable that is determined by the detection value and the relationship specifying data, a reward calculation process that assigns a greater reward when the detection value indicates that the traveling performance of the first vehicle is higher than a reference performance than when the detection value indicates that the traveling performance of the first vehicle is not higher than the reference performance, an updating process that updates the relationship specifying data using the detection value, the value of the action variable used for operation of the electronic device, and the reward corresponding to the operation as inputs to a predetermined update mapping, and a data replacement process that receives the relationship specifying data from the second vehicle and replaces the relationship specifying data stored in the storage device with the relationship specifying data received from the second vehicle when the performance determination process determines that the traveling performance of the first vehicle is lower than the traveling performance of the second vehicle. The update mapping may be configured to output the relationship specifying data that is updated so that an expected return of the reward is increased when the electronic device is operated in accordance with the relationship specifying data.

When it is determined that the traveling performance of the first vehicle is lower than the traveling performance of the second vehicle based on a comparison of the traveling performance index of the second vehicle with the traveling performance index of the first vehicle, there is a possibility that adjustment of the relationship between the state of the vehicle and the action variable is delayed in the first vehicle as compared to the second vehicle. In the configuration described above, when it is determined that the traveling performance of the first vehicle is lower than the traveling performance of the second vehicle, the relationship specifying data stored in the storage device of the first vehicle is replaced with the relationship specifying data used in the second vehicle. As a result, the traveling performance of the first vehicle is improved as compared to before the replacement of the relationship specifying data.

Aspect 4. In the vehicle controller according to aspect 3, the processing circuitry may be configured to execute an abnormality notification process that notifies that the first vehicle has an abnormality when the traveling performance of the first vehicle is not improved despite replacement of the relationship specifying data in the storage device by executing the data replacement process.

When the traveling performance of the first vehicle is not improved despite the replacement of the relationship specifying data stored in the storage device of the first vehicle with the relationship specifying data used in the second vehicle, it is considered that the low traveling performance, that is, the low acceleration performance, of the first vehicle is not due to the delay in adjusting the relationship between the state of the vehicle and the action variable. In the configuration described above, when the traveling performance of the first vehicle is not improved even after the replacement of the relationship specifying data, notification that the first vehicle has an abnormality is issued because there is a possibility that a component of the first vehicle has an abnormality such as a failure. This prompts the owner of the vehicle including the vehicle controller to take the vehicle to a repair shop or the like.

Aspect 5. In the vehicle controller according to any one of aspects 1 to 4, the processing circuitry may be configured to derive an index related to an energy usage efficiency of a vehicle as the traveling performance index in the index deriving process and determine whether an energy usage efficiency of the first vehicle is lower than an energy usage efficiency of the second vehicle in the performance determination process.

Aspect 6. In the vehicle controller according to any one of aspects 1 to 4, the processing circuitry may be configured to derive an index related to an acceleration performance of a vehicle as the traveling performance index in the index deriving process and determine whether an acceleration performance of the first vehicle is lower than an acceleration performance of the second vehicle in the performance determination process.

Aspect 7. In the vehicle controller according to any one of aspects 1 to 6, the processing circuitry may be configured to execute a load amount obtaining process that obtains an estimation value of an amount of load on the first vehicle and a load amount receiving process that receives an estimation value of an amount of load on the second vehicle through the vehicle-to-vehicle communication. The processing circuitry may be configured to execute the performance determination process on condition that a difference between the estimation value of the amount of load on the second vehicle and the estimation value of the amount of load on the first vehicle is less than a load amount difference determination value.

When the traveling performance indexes are compared between two vehicles having different load amounts, the traveling performance of the vehicle having the smaller load amount is likely to be higher than the traveling performance of the vehicle having the larger load amount. In the configuration described above, the performance determination process is executed on condition that the difference between the estimation value of the amount of load on the second vehicle and the estimation value of the amount of load on the first vehicle is less than the load amount difference determination value. In other words, when the difference is greater than or equal to the load amount difference determination amount, the performance determination process is not executed. This avoids execution of the performance determination process when it is determined that the load amounts greatly differ between the first vehicle and the second vehicle.

Aspect 8. In the vehicle controller according to any one of aspects 1 to 7, the processing circuitry may be configured to execute a travel distance obtaining process that obtains a travel distance of the first vehicle and a travel distance receiving process that receives a travel distance of the second vehicle through the vehicle-to-vehicle communication. The processing circuitry may be configured to execute the performance determination process on condition that a difference between the travel distance of the second vehicle and the travel distance of the first vehicle is less than a distance difference determination value.

It may be assumed that, as the travel distance of a vehicle increases, the deterioration degree of the properties of components in the vehicle is increased. It may also be assumed that, as the deterioration degree of the properties of components in the vehicle is increased, the performance of the vehicle tends to be lowered. In the configuration described above, the performance determination process is executed on the condition that the difference between the travel distance of the second vehicle and the travel distance of the first vehicle is less than the distance difference determination value. In other words, when the difference is greater than or equal to the distance difference determination amount, the performance determination process is not executed. This avoids execution of the performance determination process when there is a possibility that the deterioration degree of the properties of components in the first vehicle greatly differs from the deterioration degree of the properties of components in the second vehicle.

Aspect 9. An aspect of the present disclosure provides a vehicle control method applied to a first vehicle. The first vehicle is configured to directly perform vehicle-to-vehicle communication with a second vehicle that is traveling in proximity to the first vehicle. The vehicle control method includes: executing an index deriving process that derives a traveling performance index of the first vehicle with processing circuitry of the first vehicle, the traveling performance index being an index related to a traveling performance; executing an index receiving process that receives the traveling performance index of the second vehicle from the second vehicle through the vehicle-to-vehicle communication with the processing circuitry; and executing a performance determination process that compares the traveling performance index of the second vehicle with the traveling performance index of the first vehicle to determine whether a traveling performance of the first vehicle is lower than a traveling performance of the second vehicle with the processing circuitry.

This method causes the processing circuitry of the vehicle to execute the processes described above. Thus, the same advantages as the vehicle controller described above are obtained.

Aspect 10. An aspect of the present disclosure provides a non-transitory computer readable medium configured to store a vehicle control program. When the vehicle control program is executed in processing circuitry of a first vehicle configured to directly perform vehicle-to-vehicle communication with a second vehicle that is traveling in proximity to the first vehicle, the vehicle control program causes the processing circuitry to execute: an index deriving process that derives a traveling performance index of the first vehicle, the traveling performance index being an index related to a traveling performance; an index receiving process that receives the traveling performance index of the second vehicle from the second vehicle through the vehicle-to-vehicle communication; and a performance determination process that compares the traveling performance index of the second vehicle with the traveling performance index of the first vehicle to determine whether a traveling performance of the first vehicle is lower than a traveling performance of the second vehicle.

With this configuration, the vehicle control program is installed in the vehicle, and the processing circuitry executes the processes described above. Thus, the same advantages as the vehicle controller described above are obtained.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a vehicle controller and a vehicle control method will be described below with reference to the drawings.

Figure 1:
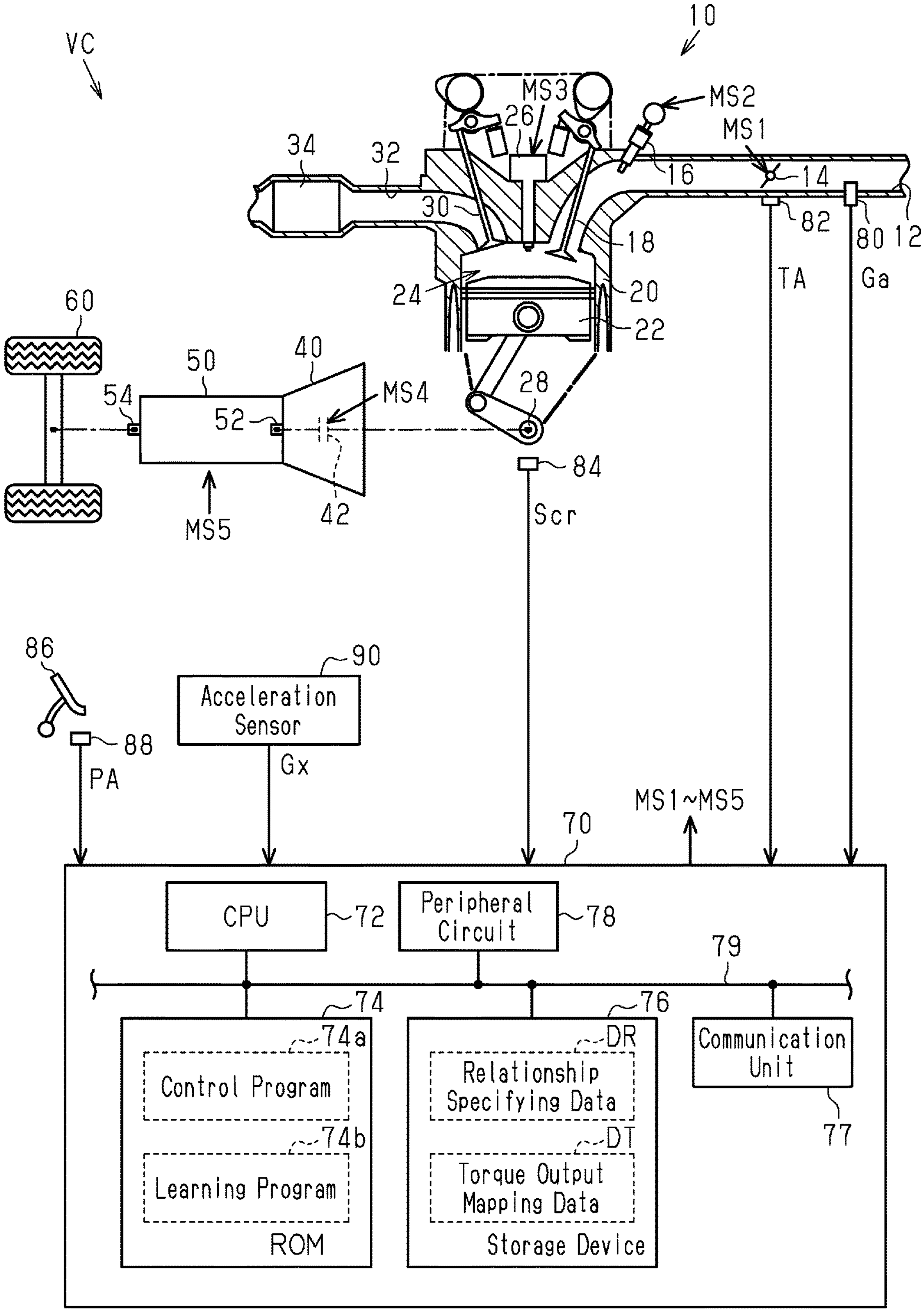
FIG. 1 is a diagram showing a controller and a drive system in a first embodiment.

FIG. 1 shows the configurations of a controller 70, that is, a vehicle controller, and a drive system of a vehicle VC including the controller 70.

As shown in FIG. 1, the vehicle VC includes an internal combustion engine 10 as a propulsive force generator of the vehicle VC. The internal combustion engine 10 includes an intake passage 12 provided with a throttle valve 14 and a fuel injection valve 16, which are sequentially arranged from the upstream side. When an intake valve 18 is open, air drawn into the intake passage 12 and fuel injected from the fuel injection valve 16 flow into a combustion chamber 24 defined by a cylinder 20 and a piston 22. In the combustion chamber 24, a mixture of the air and the fuel is burned by spark discharge of an ignition device 26, and energy generated by the combustion is converted into rotational energy of a crankshaft 28 via the piston 22. The burned air-fuel mixture is discharged to an exhaust passage 32 as exhaust when an exhaust valve 30 is open. The exhaust passage 32 is provided with a catalyst 34 used as a post-processing device that purifies the exhaust.

The crankshaft 28 is configured to be mechanically coupled to an input shaft 52 of a transmission 50 by a torque converter 40 including a lock-up clutch 42. The transmission 50 is a device that variably sets the transmission ratio, that is, the ratio of rotation speed of the input shaft 52 to rotation speed of an output shaft 54. The output shaft 54 is mechanically coupled to drive wheels 60.

The controller 70 controls the internal combustion engine 10 and operates operating units of the internal combustion engine 10 such as the throttle valve 14, the fuel injection valve 16, and the ignition device 26 to control torque, an exhaust component ratio, and other control aspects. The controller 70 also controls the torque converter 40 and operates the lock-up clutch 42 to control the engagement state of the lock-up clutch 42. The controller 70 also controls the transmission 50 and operates the transmission 50 to control the transmission ratio, which is the control aspect of the transmission 50. FIG. 1 shows operating signals MS1 to MS5 of the throttle valve 14, the fuel injection valve 16, the ignition device 26, the lock-up clutch 42, and the transmission 50, respectively. The operating units that receive the operating signals MS1 to MS5 from the controller 70 are each an example of an "electronic device."

To control the control aspects, the controller 70 refers to an intake air amount Ga that is detected by an airflow meter 80, a throttle opening degree TA, which is an opening degree of the throttle valve 14 detected by a throttle sensor 82, and an output signal Scr of a crank angle sensor 84. In addition, the controller 70 refers to an accelerator operation amount PA, which is a depression amount of an accelerator pedal 86 detected by an accelerator sensor 88, and an acceleration rate Gx in the front-rear direction of the vehicle VC detected by an acceleration sensor 90.

The controller 70 includes a central processing unit (CPU) 72, a read only memory (ROM) 74, a storage device 76, which is an electrically rewritable nonvolatile memory, a communication unit 77, and a peripheral circuit 78, which are configured to communicate with each other through a local network 79. The peripheral circuit 78 includes a circuit that generates a clock signal regulating an internal operation, a power supply circuit, a reset circuit, and the like.

The ROM 74 stores a control program 74*a* and a learning program 74*b*. The storage device 76 stores relationship specifying data DR. The relationship specifying data DR specifies the relationship among the accelerator operation amount PA, a throttle opening degree instruction value TA*, which is an instruction value of the throttle opening degree TA, and a retardation amount aop of the ignition device 26. The throttle opening degree instruction value TA* and the retardation amount aop are each an example of an action variable. The retardation amount aop is an amount of retardation from a predetermined reference ignition timing. The reference ignition timing is the more retarded one of the minimum advance for the best torque (MBT) ignition timing and the knock limit point. The MBT ignition timing is the ignition timing at which the maximum torque is obtained (maximum torque ignition timing). The knock limit point is the advance limit value of the ignition timing at which knocking is restrained within an allowable level under the assumed best condition using a fuel with a high octane number, which has a high knock limit. The storage device 76 also stores torque output mapping data DT. The torque output mapping data DT specifies a torque output map that uses rotation speed NE of the crankshaft 28, charging efficiency $\eta$, and ignition timing aig as inputs to output torque Trq.

Figure 2:
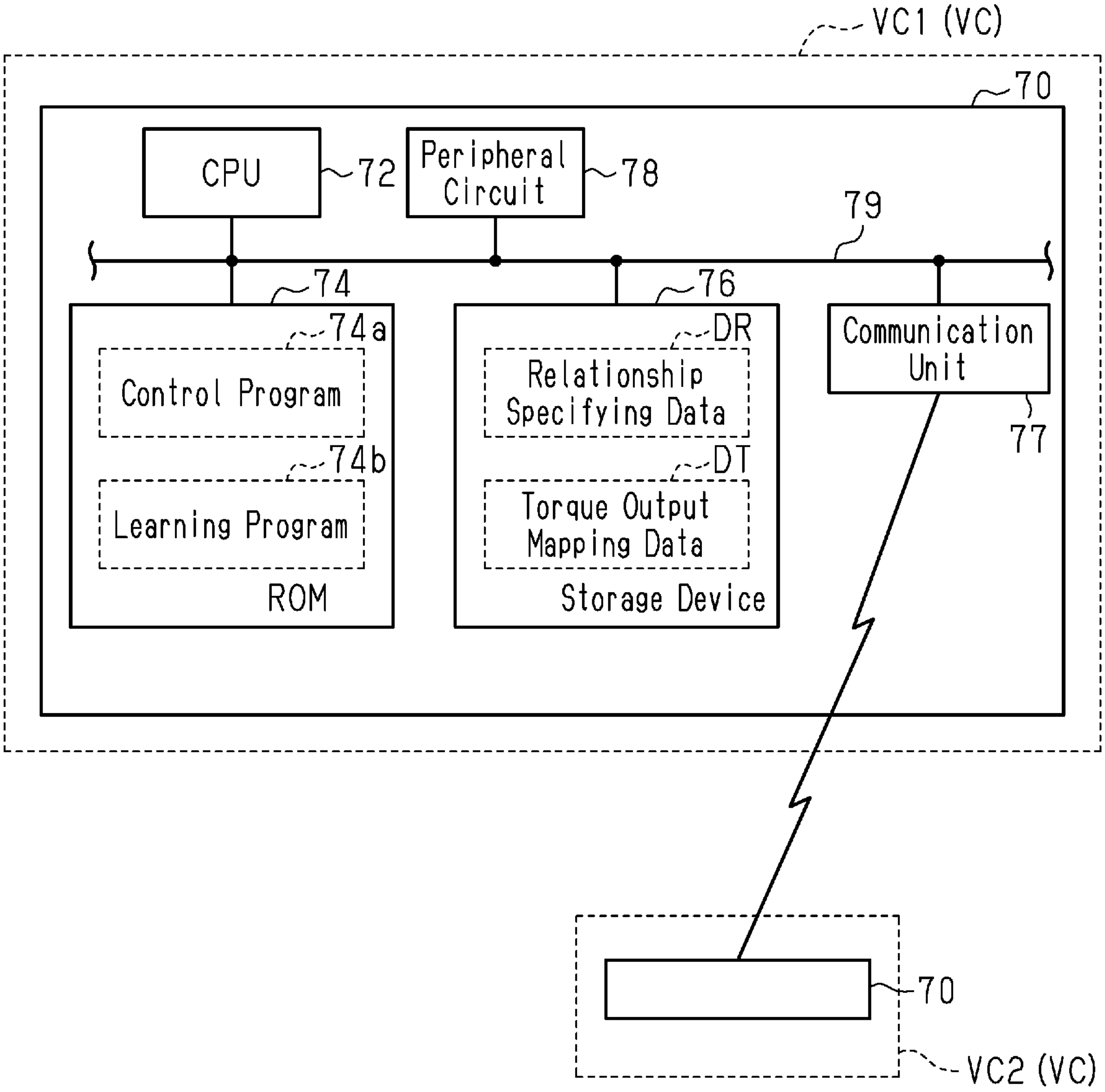
FIG. 2 is a block diagram schematically showing vehicle-to-vehicle communication between vehicles each including the controller.

As shown in FIG. 2, the communication unit 77 is configured to perform vehicle-to-vehicle communication, which is communication directly performed between vehicles. Vehicle-to-vehicle communication refers to communication that is directly performed between vehicles without using a server or the like when the vehicles are traveling in proximity to each other. That is, the vehicle VC including the communication unit 77 may be referred to as a vehicle configured to perform vehicle-to-vehicle communication. In the description hereafter, the subject vehicle may be referred to as "the subject vehicle VC1," and another vehicle that performs vehicle-to-vehicle communication with the subject vehicle VC1 may be referred to as "the further vehicle VC2."

The controller 70 of the subject vehicle VC1 is configured to exchange various types of information with the controller 70 of the further vehicle VC2 through vehicle-to-vehicle communication. When vehicle-to-vehicle communication is performable, the subject vehicle VC1 is traveling in proximity to the further vehicle VC2 configured to perform vehicle-to-vehicle communication with the subject vehicle VC1. That is, two vehicles that perform vehicle-to-vehicle communication with each other are travelling in the same traveling environment.

Figure 3:
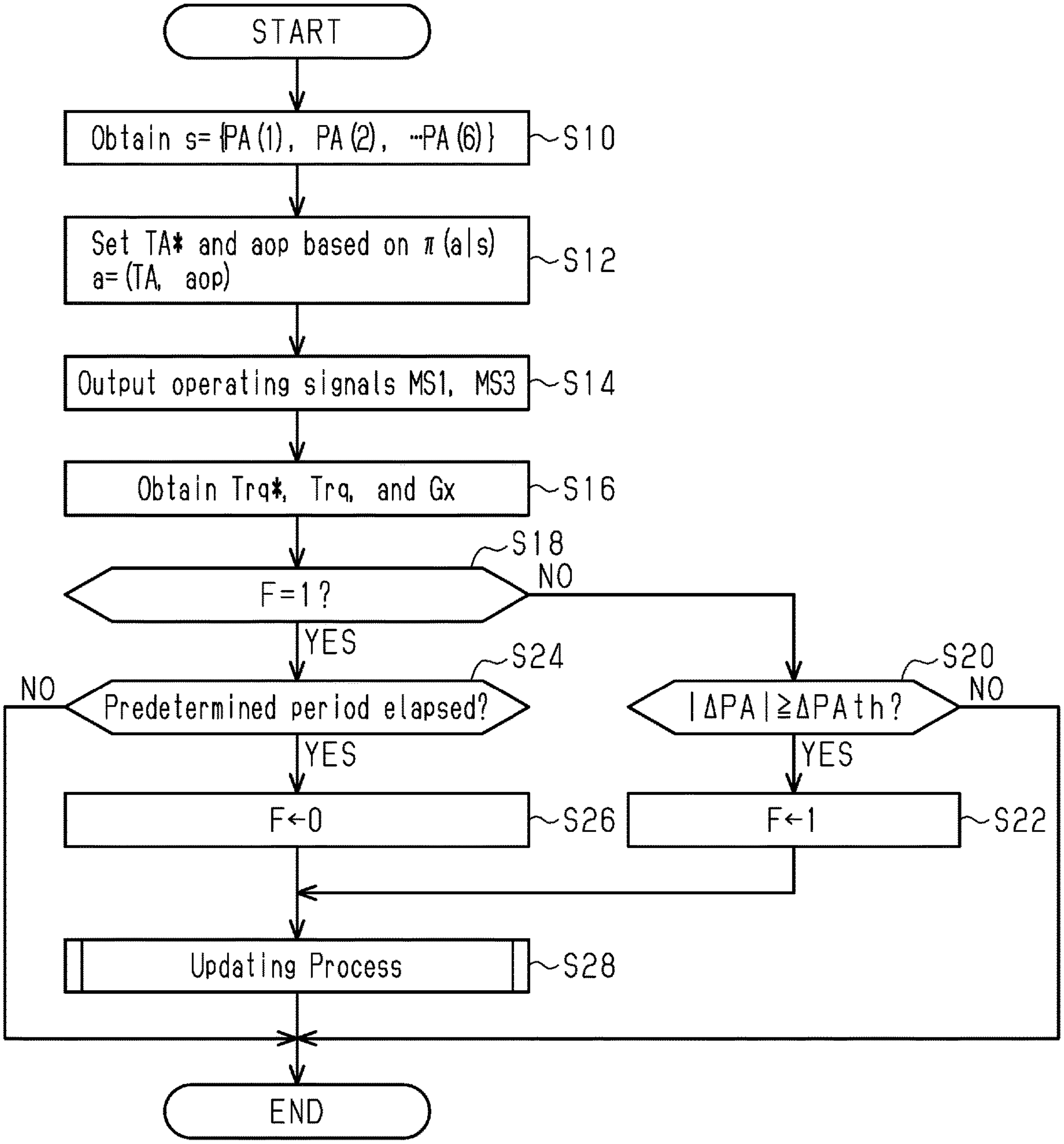
FIG. 3 is a flowchart showing the procedures of a process executed by the controller.

FIG. 3 shows the procedures of a process executed by the controller 70. The process shown in FIG. 3 is implemented by the CPU 72, for example, repeatedly executing the control program 74*a* and the learning program 74*b* stored in the ROM 74 in a predetermined cycle. In the following description, the step number of each process is represented by a numeral provided with an "S" prefix.

In a series of the processes shown in FIG. 3, the CPU 72 obtains time series data including six sampling values "PA(1), PA(2), . . . PA(6)" of the accelerator operation amount PA as a state s (S10). The sampling values of time series data are sampled at different points in time. In the present embodiment, the time series data includes six sampling values that are sampled in a fixed sampling period and are consecutive on a time-series basis.

The CPU 72 sets an action a including the throttle opening degree instruction value TA* and the retardation amount aop corresponding to the state s obtained in S10 in accordance with a policy π determined by the relationship specifying data DR (S12).

In the present embodiment, the relationship specifying data DR determines an action value function Q and the policy π. In the present embodiment, the action value function Q is a table-type function indicating values of expected return corresponding to eight-dimensional independent variables of the action a and the state s. When a state s is given, while giving priority to selecting the maximum action a (greedy action) in the action value function Q with the independent variable corresponding to the given state s, the policy π sets a rule of selecting another action a at a predetermined probability.

More specifically, in the present embodiment, the number of possible values of the independent variable in the action value function Q is such that some of all combinations of possible values of the state s and the action a are eliminated based on human knowledge or the like. That is, for example, when one of two consecutive sampling values in time series data of the accelerator operation amount PA is the minimum value of the accelerator operation amount PA, the other sampling value may be the maximum value of the accelerator operation amount PA. Such sampling values cannot be obtained when the accelerator pedal 86 is manually operated and thus are not defined in the action value function Q. In the present embodiment, the dimensions are reduced based on the human knowledge or the like so that possible values of the independent variable defining the action value function Q are limited to ten to the fourth power or less, and more desirably, ten to the third power or less.

The CPU 72 transmits the operating signal MS1 to the throttle valve 14 to operate the throttle opening degree TA based on the throttle opening degree instruction value TA* and the retardation amount aop that has been set, and transmits the operating signal MS3 to the ignition device 26 to operate the ignition timing (S14). In the present embodiment, the throttle opening degree TA is feedback-controlled to the throttle opening degree instruction value TA*. This causes operating signals MS1 to differ from each other even when the throttle opening degree instruction value TA* is the same value. When a knock control system (KCS) executes known knocking control or the like, the ignition timing is a value that is obtained by retarding the reference ignition timing by the retardation amount aop and then feedback-corrected by the KCS. The reference ignition timing is variably set by the CPU 72 in accordance with the rotation speed NE of the crankshaft 28 and the charging efficiency η. The rotation speed NE is calculated by the CPU 72 based on the output signal Scr of the crank angle sensor 84. The charging efficiency η is calculated by the CPU 72 based on the rotation speed NE and the intake air amount Ga.

The CPU 72 obtains torque Trq of the internal combustion engine 10, a torque instruction value Trq* of the internal combustion engine 10, and the acceleration rate Gx (S16). The CPU 72 calculates the torque Trq by inputting the rotation speed NE, the charging efficiency η, and the ignition timing to a torque output mapping. The CPU 72 sets the torque instruction value Trq* in accordance with the accelerator operation amount PA.

The CPU 72 determines whether a transition flag F is "1" (S18). The transition flag F indicates that the operation is in a transition state when it is "1." The transition flag F indicates that the operation is not in a transition state when it is "0." If it is determined that the transition flag F is "0" (S18: NO), the CPU 72 determines whether the absolute value of a change amount ΔPA of the accelerator operation amount PA per unit time is greater than or equal to a predetermined amount ΔPAth (S20). The change amount ΔPA may be, for example, the difference between the latest accelerator operation amount PA at a time of executing the process of S20 and the accelerator operation amount PA at a unit of time before the time of executing.

If it is determined that the absolute value of the change amount ΔPA is greater than or equal to the predetermined amount ΔPAth (S20: YES), the CPU 72 assigns "1" to the transition flag F (S22).

If it is determined that the transition flag F is "1" (S18: YES), the CPU 72 determines whether a predetermined period has elapsed since the execution of the process of S22 (S24). The predetermined period refers to a period until the absolute value of the change amount ΔPA of the accelerator operation amount PA per unit time continues to be less than or equal to a specified amount that is less than the predetermined amount ΔPAth for a predetermined time. If it is determined that the predetermined period has elapsed (S24: YES), the CPU 72 assigns "0" to the transition flag F (S26).

Upon completion of the process of S22 or S26, the CPU 72 determines that one episode is completed and updates the action value function Q through reinforcement learning (S28).

Figure 4:
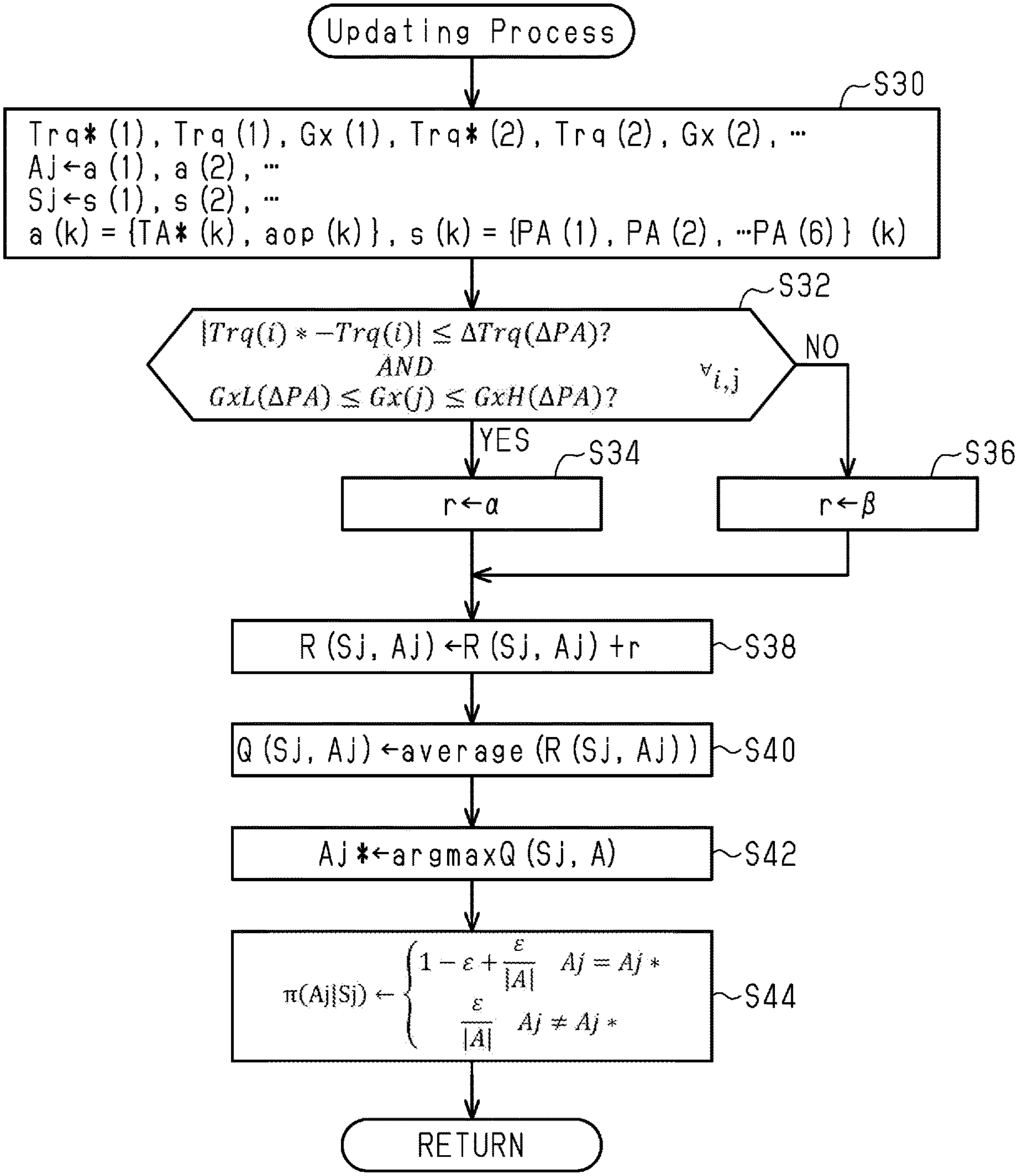
FIG. 4 is a flowchart showing an updating process executed by the controller.

FIG. 4 shows details of the process of S28.

In a series of the processes shown in FIG. 4, the CPU 72 obtains time series data including a set of three sampling values that are the torque instruction value Trq*, the torque Trq, and the acceleration rate Gx in the episode that was most recently completed, and time series data of the state s and the action a (S30). The most recent episode corresponds to the period for which the transition flag F is continuously "0" when the process of S30 is executed following the process of S22, and corresponds to the period for which the transition flag F is continuously "1" when the process of S3 is executed following the process of S26.

In FIG. 4, elements having different numerals in parentheses indicate values of a variable sampled at different times. For example, the torque instruction value Trq*(1) and the torque instruction value Trq*(2) are sampled at different points in time. Time series data of the action a belonging to the most recent episode is defined as an action set Aj. Time series data of the state s belonging to the same episode is defined as a state set Sj.

The CPU 72 determines whether the logical conjunction of conditions (A) and (B) is true (S32). Condition (A) is that the absolute value of a difference between any torque Trq and the torque instruction value Trq* in the most recent period is less than or equal to a specified amount ΔTrq. Condition (B) is that the acceleration rate Gx is greater than or equal to a lower limit value G×L and less than or equal to an upper limit value G×H.

The CPU 72 variable sets the specified amount ΔTrq in accordance with the change amount ΔPA of the accelerator operation amount PA per unit time at the time of starting the episode. That is, if it is determined that the episode is related to the transition state based on the change amount ΔPA of the accelerator operation amount PA per unit time at the time of starting the episode, the CPU 72 sets the specified amount ΔTrq to a greater value than when the episode is related to a steady state.

The CPU 72 variably sets the lower limit value G×L in accordance with the change amount ΔPA of the accelerator operation amount PA at the time of starting the episode. That is, when the episode is related to the transition state and the change amount ΔPA is a positive value, the CPU 72 sets the lower limit value G×L to a greater value than when the episode is related to the steady state. When the episode is related to the transition state and the change amount ΔPA is a negative value, the CPU 72 sets the lower limit value G×L to a smaller value than when the episode is related to the steady state.

The CPU 72 variable sets the upper limit value G×H in accordance with the change amount ΔPA of the accelerator operation amount PA per unit time at the time of starting an episode. That is, when the episode is related to the transition state and the change amount ΔPA is a positive value, the CPU 72 sets the upper limit value G×H to a greater value than when the episode is related to the steady state. When the episode is related to the transition state and the change amount ΔPA is a negative value, the CPU 72 sets the upper limit value G×H to a smaller value than when the episode is related to the steady state.

If it is determined that the logical conjunction is true (S32: YES), the CPU 72 assigns a positive value α to the reward r (S34). If it is determined that the logical conjunction is false (S32: NO), the CPU 72 assigns a negative value β to the reward r (S36). For example, the negative value β is the product of the positive value α and "−1." When the process of S34 or S36 is completed, the CPU 72 updates the relationship specifying data DR stored in the storage device 76 shown in FIG. 1. In the present embodiment, an ε-soft on-policy Monte Carlo method is used.

More specifically, the CPU 72 adds the reward r to each return R(Sj, Aj) determined by a combination of each state and the corresponding action retrieved in S30 (S38). "R(Sj, Aj)" collectively refers to a return R when one of the elements in the state set Sj is used as the state and one of the elements in the action set Aj is used as the action. The returns R(Sj, Aj) determined by combinations of each state and the corresponding action retrieved in S30 are averaged, and the average is assigned to the corresponding action value function Q(Sj, Aj) (S40). The averaging may be a process that divides the return R calculated in S38 by a value obtained by adding a predetermined number to the number of times S38 was executed. The initial value of the return R may be the initial value of the corresponding action value function Q.

For each state retrieved in S30, the CPU 72 assigns an action including a combination of the throttle opening degree instruction value TA* and the retardation amount aop corresponding to the maximum value in the corresponding action value function Q(Sj, A) to an action Aj* (S42). In this description, "A" indicates any possible action. Although the action Aj* has different values in accordance with the type of state retrieved in S30, the presentation is simplified and denoted by the same symbol.

For each state retrieved in S30, the CPU 72 updates the corresponding policy π(Aj|Sj) (S44). More specifically, when the total number of actions is denoted by "|A|," the selection probability of the action Aj* selected by S42 is expressed as "1−ε+ε/|A|." The selection probability of each action other than the action Aj* is expressed as "ε/|A|." The number of actions other than the action Aj* is "|A|−1." The process of S44 is based on the action value function Q that is updated in S40. Thus, the relationship specifying data DR, which specifies the relationship between the state s and the action a, is updated to increase the return R.

Upon completion of the process of S44, the CPU 72 temporarily ends the series of the processes shown in FIG. 4.

Referring again to FIG. 3, when the process of S28 is completed or a negative determination is made in S20 or S24, the CPU 72 temporarily ends the series of the processes shown in FIG. 3. The processes of S10 to S26 are implemented by the CPU 72 executing the control program 74*a*. The process of S28 is implemented by the CPU 72 executing the learning program 74*b*. At the shipment of the vehicle VC, the relationship specifying data DR includes data that has been learned by executing the same process shown in FIG. 3, for example, while simulating traveling of the vehicle at a test bench.

Figure 5:
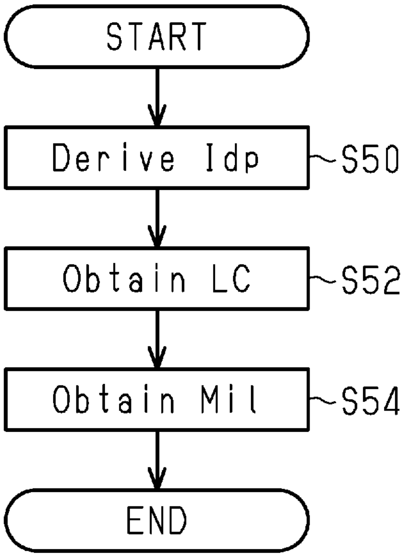
FIG. 5 is a flowchart showing the procedures of a process executed by the controller when deriving information that is transmitted to a further vehicle.

As described above, the controller 70 is configured to exchange various types of information with the controller 70 of a further vehicle. FIG. 5 shows the procedures of a process executed by the controller 70 for deriving information that is transmitted to the further vehicle. The process shown in FIG. 5 is implemented by the CPU 72, for example, repeatedly executing the control program 74*a* stored in the ROM 74 in a predetermined cycle.

In a series of the processes shown in FIG. 5, the CPU 72 derives a traveling performance index Idp, which is an index related to the traveling performance of the vehicle VC (S50).

In the present embodiment, the traveling performance includes an acceleration performance of the vehicle VC. That is, the traveling performance index Idp may refer to an index related to the acceleration performance of the vehicle VC. When the accelerator operation amount PA changes, the torque instruction value Trq* is set in accordance with the accelerator operation amount PA. A vehicle VC in which torque Trq of the internal combustion engine 10 is not likely to deviate from the torque instruction value Trq* has a higher acceleration performance than a vehicle VC in which torque Trq of the internal combustion engine 10 is likely to deviate from the torque instruction value Trq*. For example, when the accelerator operation amount PA increases, an increase rate change ratio CRtd is derived as the traveling performance index Idp. The increase rate change ratio CRtd is a value indicating the ratio of an increase rate of the torque Trq of the internal combustion engine 10 to an increase rate of the accelerator operation amount PA.

When the vehicle VC travels at a constant speed, the relationship between the accelerator operation amount PA and a vehicle speed SP, which is a speed of the vehicle, may be derived as the traveling performance index Idp.

The CPU 72 obtains an estimation value LC of a vehicle load amount, which is the amount of load on a vehicle VS (S52). For example, as the number of occupants of the vehicle VS increases, a larger estimation value LC of the vehicle load amount is obtained. The number of occupants may be derived from a detection result of seat sensors embedded in seats of the vehicle VS. When the vehicle VS includes a camera configured to capture an image of the inside of the passenger compartment, the number of occupants of the vehicle VS may be derived from an image capturing result of the camera.

The CPU 72 obtains a travel distance Mil of the vehicle VS (S54). For example, a measurement result of an odometer installed in the vehicle VS may be obtained as the travel distance Mil. When obtainment of the traveling performance index Idp, the estimation value LC of the vehicle load amount, and the travel distance Mil is completed, the CPU 72 temporarily ends the series of the processes shown in FIG. 5.

Figure 7:
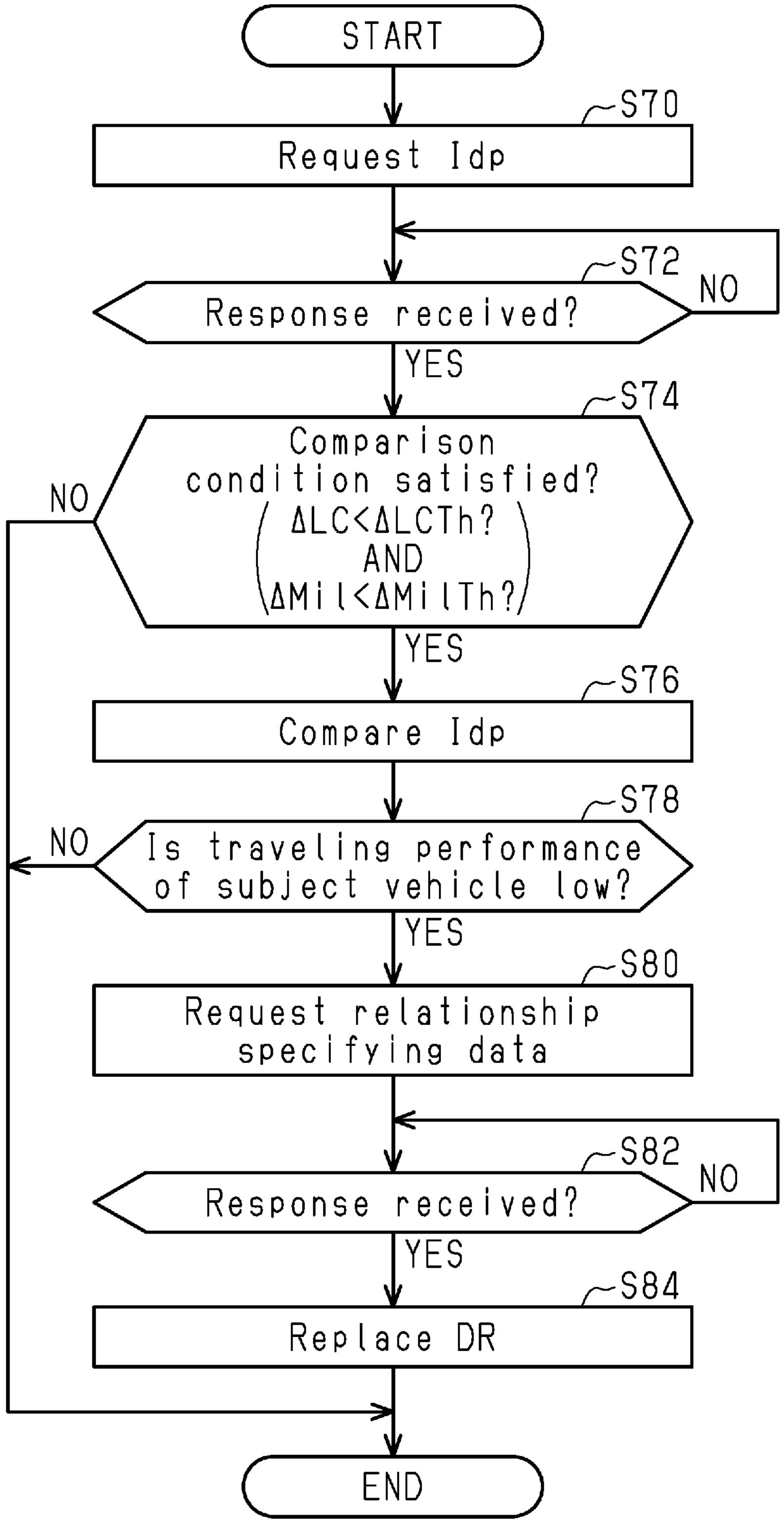
FIG. 7 is a flowchart showing the procedures of a process executed by the controller when determining whether the traveling performance of a subject vehicle is lower than the traveling performance of a further vehicle.

In the present embodiment, the traveling performance index Idp of the subject vehicle VC1 is compared with the traveling performance index Idp of the further vehicle VC2 that is the same type as the subject vehicle VC1 to determine whether the traveling performance of the subject vehicle VC1 is lower than the traveling performance of the further vehicle VC2. FIG. 7 shows the procedures of a process executed by the controller 70 for performing the determination described above. A series of the processes shown in FIG. 7 is implemented by the CPU 72 executing the control program 74*a* stored in the ROM 74.

In the present embodiment, the vehicle VC searches for another vehicle configured to perform vehicle-to-vehicle communication while traveling. When a further vehicle VC2 configured to perform vehicle-to-vehicle communication is found, a series of the processes shown in FIG. 7 is started on condition that the further vehicle VC2 is the same type as the subject vehicle VC1.

In the series of the processes shown in FIG. 7, the CPU 72 requests the traveling performance index Idp from the further vehicle VC2 that is configured to perform vehicle-to-vehicle communication (S70). At this time, the CPU 72 requests the estimation value LC of the vehicle load amount and the travel distance Mil of the further vehicle VC2 in addition to the traveling performance index Idp. In this description, the traveling performance index Idp of the subject vehicle VC1 is referred to as "the traveling performance index Idp1," the estimation value LC of the vehicle load amount of the subject vehicle VC1 is referred to as "the estimation value LC1 of the vehicle load amount," and the travel distance of the subject vehicle VC1 is referred to as "the travel distance Mil1." Also, the traveling performance index Idp of the further vehicle VC2 is referred to as "the traveling performance index Idp2," the estimation value LC of the vehicle load amount of the further vehicle VC2 is referred to as "the estimation value LC2 of the vehicle load amount," and the travel distance of the further vehicle VC2 is referred to as "the travel distance Mil2."

The CPU 72 determines whether the traveling performance index Idp2, the estimation value LC2 of the vehicle load amount, and the travel distance Mil2 are received from the further vehicle VC2 as a response to the request (S72). If the reception of the response is not completed (S72: NO), the CPU 72 repeats the determination until the reception of the response is completed. If the reception of the response is completed (S72: YES), the CPU 72 determines whether a comparison condition is satisfied (S74). For example, if the traveling performance is compared between two vehicles having different estimation values LC of the vehicle load amount and a determination is made based on the comparison, the accuracy of the determination may not be high. In addition, as the travel distance Mil of the vehicle increases, the properties of various electronic devices mounted on the vehicle deteriorate more. That is, when the travel distances Mil differ between the subject vehicle VC1 and the further vehicle VC2, deterioration levels of the properties of the electronic devices may differ between the subject vehicle VC1 the further vehicle VC2. Under such a condition, when the traveling performances are compared between the subject vehicle VC1 and the further vehicle VC2 and a determination is made based on the comparison, the accuracy of the determination may not be high.

In this regard, the CPU 72 determines, for example, whether the logical conjunction of condition (C) and condition (D) is true. Condition (C) is that a difference ΔLC between the estimation value LC1 of the vehicle load amount of the subject vehicle VC1 and the estimation value LC2 of the vehicle load amount of the further vehicle VC2 is less than a load amount difference determination value ΔLCTh. Condition (D) is that a difference ΔMil between the travel distance Mil1 of the subject vehicle VC1 and the travel distance Mil2 of the further vehicle VC2 is less than a distance difference determination value ΔMilTh. If the logical conjunction is true, the CPU 72 determines that the comparison condition is satisfied. If the logical conjunction is false, the CPU 72 determines that the comparison condition is not satisfied.

If the comparison condition is not satisfied (S74: NO), the CPU 72 temporarily ends the series of the processes shown in FIG. 7. If the comparison condition is satisfied (S74: YES), the CPU 72 compares the traveling performance index Idp1 of the subject vehicle VC1 with the traveling performance index Idp2 of the further vehicle VC2 (S76).

The comparison of the traveling performance index Idp1 of the subject vehicle VC1 with the traveling performance index Idp2 of the further vehicle VC2 executed when the increase rate change ratio CRtd is derived as the traveling performance index Idp will now be described. At approximately the same increase rate of the accelerator operation amount PA, it may be assumed that the traveling performance, that is, the acceleration performance, of the vehicle VC is increased as the increase rate of the torque Trq of the internal combustion engine 10 is increased. At approximately the same increase rate of the torque Trq of the internal combustion engine 10, it may be assumed that the traveling performance, that is, the acceleration performance, of the vehicle VC is increased as the increase rate of the accelerator operation amount PA is decreased. Therefore, when the increase rate change ratio CRtd of the subject vehicle VC1 is lower than the increase rate change ratio CRtd of the further vehicle VC2, the CPU 72 determines that the traveling performance of the subject vehicle VC1 is lower than the traveling performance of the further vehicle VC2, that is, that the acceleration performance of the subject vehicle VC1 is lower than the acceleration performance of the further vehicle VC2. When the increase rate change ratio CRtd of the subject vehicle VC1 is greater than or equal to the increase rate change ratio CRtd of the further vehicle VC2, the CPU 72 determines that the traveling performance of the subject vehicle VC1 is not lower than the traveling performance of the further vehicle VC2, that is, that the acceleration performance of the subject vehicle VC1 is not lower than the acceleration performance of the further vehicle VC2.

The comparison of the traveling performance index Idp1 of the subject vehicle VC1 with the traveling performance index Idp2 of the further vehicle VC2 performed when the vehicle VC is traveling at a constant speed and the relationship between the accelerator operation amount PA and the vehicle speed SP is derived as the traveling performance index Idp will now be described. At approximately the same vehicle speed SP, it may be assumed that the traveling performance of the vehicle VC is increased as the accelerator operation amount PA is decreased. At approximately the same accelerator operation amount PA, it may be assumed that the traveling performance of the vehicle VC is increased as the vehicle speed SP is increased. When the accelerator operation amount PA is large despite approximately the same vehicle speed SP and the accelerator operation amount PA is further increased to accelerate the vehicle VC, it may be assumed that the acceleration rate Gx of the vehicle VC does not readily increase. In this case, if it is determined that the traveling performance of the subject vehicle VC1 is lower than the traveling performance of the further vehicle VC2, it may be determined that there is a possibility that the acceleration performance of the subject vehicle VC1 is lower than the acceleration performance of the further vehicle VC2.

The CPU 72 determines whether it was determined that the traveling performance of the subject vehicle VC1 was lower than the traveling performance of the further vehicle VC2 in the comparison described above. That is, in the present embodiment, it is determined that whether it was determined that the acceleration performance of the subject vehicle VC1 was lower than the acceleration performance of the further vehicle VC2 (S78). If it is determined that the traveling performance of the subject vehicle VC1 is not lower than the traveling performance of the further vehicle VC2 (S78: NO), the CPU 72 temporarily ends the series of the processes shown in FIG. 7. If it is determined that the traveling performance of the subject vehicle VC1 is lower than the traveling performance of the further vehicle VC2 (S78: YES), the CPU 72 requests the relationship specifying data DR of the further vehicle VC2 from the controller 70 of the further vehicle VC2 (S80). The CPU 72 determines whether the relationship specifying data DR of the further vehicle VC2 is received as a response to the request (S82). If the reception of the response is not completed (S82: NO), the CPU 72 repeats the determination until the reception of the response is completed. If the reception of the repose is completed (S82: YES), the CPU 72 replaces the relationship specifying data DR stored in the storage device 76 with the relationship specifying data DR received from the further vehicle VC2 (S84). Upon completion of the data replacement, the CPU 72 temporarily ends the series of the processes shown in FIG. 7.

Figure 6:
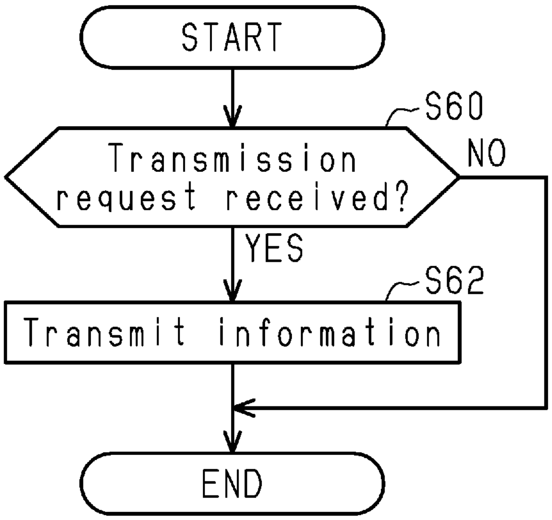
FIG. 6 is a flowchart showing the procedures of a process executed by the controller when transmitting information to a further vehicle.

FIG. 6 shows the procedures of a process executed by the controller 70 when receiving a request for transmission of information from another vehicle through vehicle-to-vehicle communication. The process shown in FIG. 6 is implemented by the CPU 72, for example, repeatedly executing the control program 74*a* stored in the ROM 74 in a predetermined cycle.

In a series of the processes shown in FIG. 6, the CPU 72 determines whether a request for transmission of information is received from the controller 70 of a further vehicle through vehicle-to-vehicle communication (S60). If there is no request for transmission (S60: NO), the CPU 72 temporarily ends the series of the processes shown in FIG. 6. If there is a request for transmission (S60: YES), the CPU 72 transmits the requested information to the controller 70 of the further vehicle through vehicle-to-vehicle communication. For example, when the traveling performance index Idp, the estimation value LC of the vehicle load amount, and the travel distance Mil are requested, the CPU 72 transmits the traveling performance index Idp, the estimation value LC of the vehicle load amount, and the travel distance Mi that are derived in the series of the processes shown in FIG. 5 via the communication unit 77. When the relationship specifying data DR is requested, the CPU 72 transmits the relationship specifying data DR stored in the storage device 76 via the communication unit 77. When the transmission is completed, the CPU 72 temporarily ends the series of the processes shown in FIG. 6.

Figure 8:
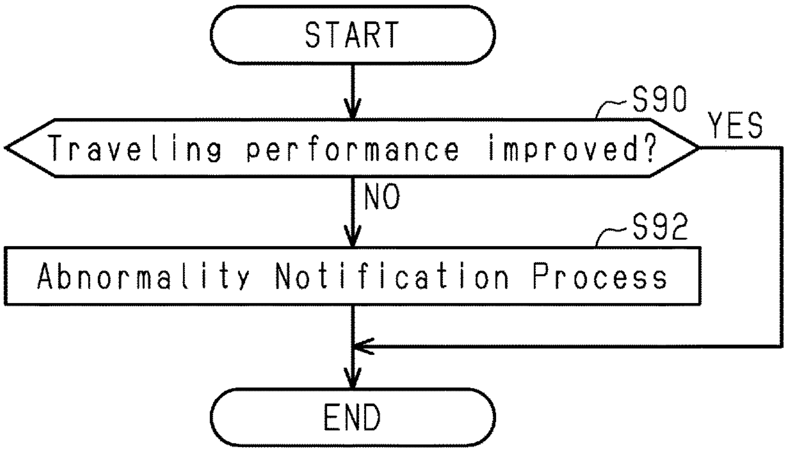
FIG. 8 is a flowchart showing the procedures of a process executed by the controller when executing an abnormality notification process.

In the series of the processes shown in FIG. 7, the reason why it is determined that the traveling performance of the subject vehicle VC1 is lower than the traveling performance of the further vehicle VC2 may be a delay in updating the relationship specifying data DR in the subject vehicle VC1. In this case, when the relationship specifying data DR of the further vehicle VC2 having a higher traveling performance than the subject vehicle VC1 is stored in the storage device 76 of the subject vehicle VC1 and then the subject vehicle VC1 travels, the traveling performance of the subject vehicle VC1 is expected to be improved. In other words, if the traveling performance of the subject vehicle VC1 does not improve despite the replacement of the relationship specifying data DR, it is considered that the low traveling performance of the subject vehicle VC1 is not due to the delay in updating the relationship specifying data DR in the subject vehicle VC1. FIG. 8 shows the procedures of a process executed by the controller 70 when the vehicle VC is traveling subsequent to the replacement of the relationship specifying data DR. A series of the processes shown in FIG. 8 is implemented by the CPU 72 executing the control program 74*a* stored in the ROM 74. The series of the processes shown in FIG. 8 is started on condition that data allowing for determination of improvement of the traveling performance of the vehicle VC is obtained by replacing the relationship specifying data DR in accordance with execution of a data replacement process.

In the series of the processes shown in FIG. 8, the CPU 72 determines whether the traveling performance of the vehicle VC is improved by replacing the relationship specifying data DR in accordance with execution of the data replacement process (S90). That is, in the present embodiment, the CPU 72 determines whether the acceleration performance of the vehicle VC is improved.

The determination of whether the traveling performance index Idp of the vehicle VC is improved will be described, for example, when the increase rate change ratio CRtd is derived as the traveling performance index Idp. When the increase rate change ratio CRtd derived subsequent to replacement of the relationship specifying data DR is higher than the increase rate change ratio CRtd derived prior to the replacement of the relationship specifying data DR, it is determined that the traveling performance of the vehicle VC is improved. When the increase rate change ratio CRtd derived subsequent to replacement of the relationship specifying data DR is not higher than the increase rate change ratio CRtd derived prior to the replacement of the relationship specifying data DR, the CPU 72 determines that the traveling performance of the vehicle VC is not improved.

The determination of whether the traveling performance index Idp of the vehicle VC is improved will now be described, for example, when the relationship between the accelerator operation amount PA and the vehicle speed SP is derived as the traveling performance index Idp. For example, the vehicle speed SP indicated by the relationship prior to replacement of the relationship specifying data DR is referred to as a pre-replacement vehicle speed. The CPU 72 derives a vehicle speed SP that is equal to the pre-replacement vehicle speed and an accelerator operation amount PA corresponding to the vehicle speed SP as the relationship subsequent to the replacement of the relationship specifying data DR. When the accelerator operation amount PA indicated by the relationship subsequent to the replacement is less than the accelerator operation amount PA indicated by the relationship prior to the replacement, the CPU 72 determines that the traveling performance of the vehicle VC is improved. When the accelerator operation amount PA indicated by the relationship prior to the replacement is greater than or equal to the accelerator operation amount PA indicated by the relationship subsequent to the replacement, the CPU 72 determines that the traveling performance of the vehicle VC is not improved.

The traveling performance index Idp, such as the increase rate change ratio CRtd and the relationship between the accelerator operation amount PA and the vehicle speed SP, may be affected by a condition of the road surface on which the vehicle travels, which is, for example, the gradient of the road surface. Therefore, the determination described above is performed when the traveling performance index Idp is derived under approximately the same road surface condition as the point in time of deriving the traveling performance index Idp prior to the replacement of the relationship specifying data DR.

If it is determined that the traveling performance of the vehicle VC is improved (S90: YES), the CPU 72 temporarily ends the series of the processes shown in FIG. 8. If it is determined that the traveling performance of the vehicle VC is not improved (S90: NO), the CPU 72 executes an abnormality notification process that notifies that the vehicle VC, more specifically, the internal combustion engine 10 of the vehicle VC, has an abnormality (S92). The abnormality notification process, for example, notifies the occupants of the vehicle VC using a guide device arranged in the passenger compartment. The guide device includes, for example, an on-board speaker or an on-board screen.

When the notification is issued, the CPU 72 temporarily ends the series of the processes shown in FIG. 8.

The operation and advantages of the present embodiment will now be described.

(1) When the further vehicle VC2 is the same type as the subject vehicle VC1 and is traveling in a range that allows for vehicle-to-vehicle communication with the subject vehicle VC1, the controller 70 of the subject vehicle VC1 performs vehicle-to-vehicle communication with the further vehicle VC2. That is, in the present embodiment, vehicle-to-vehicle communication is performed between two vehicles that are presumably traveling in the same traveling environment. The traveling environment includes, for example, a value μ of a road surface on which the vehicle VC travels, the gradient of the road surface, and the weather.

In the present embodiment, when the subject vehicle VC1 receives the traveling performance index Idp2 from the further vehicle VC2 traveling in the same traveling environment through vehicle-to-vehicle communication, the traveling performance index Idp1 of the subject vehicle VC1 is compared with the traveling performance index Idp2 of the further vehicle VC2. Such comparison determines whether the traveling performance of the subject vehicle VC1 is lower than the traveling performance of the further vehicle VC2, that is, whether the acceleration performance of the subject vehicle VC1 is lower than the acceleration performance of the further vehicle VC2. When the traveling performance index Idp2 of the further vehicle VC2 is compared with the traveling performance index Idp1 of the subject vehicle VC1 in the same traveling environment, determination is made taking into consideration the traveling environment of the subject vehicle VC1.

(2) A case in which the traveling performance of the subject vehicle VC1 is compared with the traveling performance of the further vehicle VC2 via a server will now be considered. In this case, the server executes a process that searches for two vehicles that are in the same traveling environment. To execute this process, various types of information need to be collected from a number of vehicles VC. As a result, an enormous amount of data is collected in the server. The server uses the collected information to search for two vehicles that are in the same traveling environment. The search for two comparable vehicles VC is time consuming.

On the other hand, the range in which information is exchanged through vehicle-to-vehicle communication is relatively narrow. Therefore, it is assumed that the vehicles VC configured to perform vehicle-to-vehicle communication with each other are traveling in proximity to each other. That is, when information is exchanged through vehicle-to-vehicle communication, it is determined that the subject vehicle VC1 and the further vehicle VC2 are traveling in the same traveling environment. This limits increases in the load on the server by collecting a large amount of information to find the further vehicle VC2 that is traveling in the same traveling environment as the subject vehicle VC1. Also, increases in the time to perform the comparison are limited.

(3) When it is determined that the traveling performance of the subject vehicle VC1 is lower than the traveling performance of the further vehicle VC2 based on the comparison of the traveling performance index Idp2 of the further vehicle VC2 with the traveling performance index Idp1 of the subject vehicle VC1, there is a possibility that adjustment of the relationship between the state of the vehicle and the action variable is delayed in the subject vehicle VC1 as compared to the further vehicle VC2. That is, there is a possibility that the updating of the relationship specifying data DR in the subject vehicle VC1 is delayed as compared to the further vehicle VC2. In the present embodiment, when it is determined that the traveling performance of the subject vehicle VC1 is lower than the traveling performance of the further vehicle VC2, the relationship specifying data DR stored in the storage device 76 of the subject vehicle VC1 is replaced with the relationship specifying data DR used in the further vehicle VC2. As a result, when the traveling performance of the subject vehicle VC1 is low due to the delay in updating the relationship specifying data DR, the traveling performance, that is, the acceleration performance, of the subject vehicle VC1 is improved as compared to before the replacement of the relationship specifying data DR.

(4) If the traveling performance, that is, the acceleration performance, of the subject vehicle VC1 is not improved despite the replacement of the relationship specifying data DR stored in the storage device 76 of the subject vehicle VC1 with the relationship specifying data DR used in the further vehicle VC2, it is considered that the low traveling performance, that is, the low acceleration performance, of the subject vehicle VC1 is not due to the delay in adjusting the relationship between the state of the vehicle and the action variable. In the present embodiment, when the traveling performance, that is, the acceleration performance, of the subject vehicle VC1 is not improved even after the replacement of the relationship specifying data DR, notification that the subject vehicle VC1 has an abnormality is issued because there is a possibility that a component of the subject vehicle VC1 has an abnormality such as a failure. This prompts the owner or occupants of the vehicle VC to take the vehicle VC to a repair shop.

(5) Whether the update of the action value function Q in the subject vehicle VC1 through reinforcement learning is delayed as compared to the update of the action value function Q in the further vehicle VC2 through reinforcement learning cannot be determined based on comparison of the traveling performance indexes Idp of the vehicles VC having load amounts that greatly differ from each other. In other words, the traveling performance indexes Idp of the vehicles VC having approximately the same load amount are compared to determine whether the update of the action value function Q in the subject vehicle VC1 through reinforcement learning is delayed as compared to the update of the action value function Q in the further vehicle VC2 through reinforcement learning. In the present embodiment, the comparison is performed on condition that the difference ΔLC between the estimation value LC2 of the load amount of the further vehicle VC2 and the estimation value LC of the load amount of the subject vehicle VC1 is less than the load amount difference determination value ΔLCTh. This increases the accuracy of determination of whether the update of the action value function Q in the subject vehicle VC1 through reinforcement learning is delayed as compared to the update of the action value function Q in the further vehicle VC2 through reinforcement learning.

(6) It is assumed that as the travel distance Mil of the vehicle VC increases, the deterioration degree of properties of components in the vehicle VC is increased. Whether the update of the action value function Q in the subject vehicle VC1 through reinforcement learning is delayed as compared to the update of the action value function Q in the further vehicle VC2 through reinforcement learning cannot be determined based on comparison of the traveling performance indexes Idp of the vehicles VC in which the deterioration degrees of the properties of the components greatly differ from each other. In other words, the traveling performance indexes Idp of the vehicles VC in which the deterioration degrees of the properties of the components are approximately the same are compared to determine whether the update of the action value function Q in the subject vehicle VC1 through reinforcement learning is delayed as compared to the update of the action value function Q in the further vehicle VC2 through reinforcement learning. In the present embodiment, the comparison is performed on condition that the difference ΔMil between the travel distance Mil2 of the further vehicle VC2 and the travel distance Mil1 of the subject vehicle VC1 is less than the distance difference determination value ΔMilTh. This increases the accuracy of determination of whether the update of the action value function Q in the subject vehicle VC1 through reinforcement learning is delayed as compared to the update of the action value function Q in the further vehicle VC2 through reinforcement learning.

Second Embodiment

A second embodiment will be described below with reference to the drawings. The differences from the first embodiment will mainly be discussed.

Figure 9:
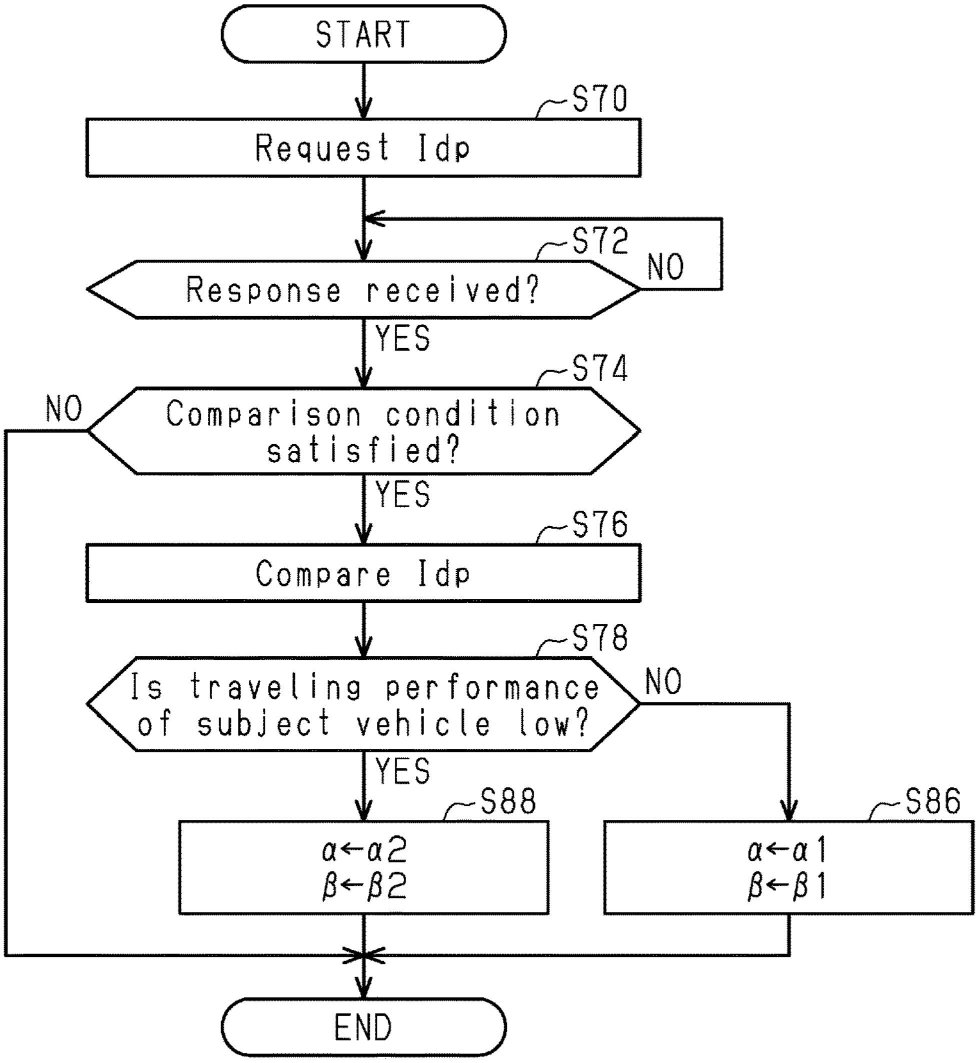
FIG. 9 is a flowchart showing the procedures of a process executed by a controller in a second embodiment when deriving information that is transmitted to a further vehicle.

FIG. 9 shows the procedures of a process executed by the controller 70 for determining whether the traveling performance of the subject vehicle VC1 is lower than the traveling performance of the further vehicle VC2, that is, determining whether the acceleration performance of the subject vehicle VC1 is lower than the acceleration performance of the further vehicle VC2. The process shown in FIG. 9 is implemented by the CPU 72, for example, repeatedly executing the control program 74*a* stored in the ROM 74 in a predetermined cycle.

In the present embodiment, the vehicle VC searches for another vehicle configured to perform vehicle-to-vehicle communication while traveling. When a further vehicle VC2 configured to perform vehicle-to-vehicle communication is found, a series of the processes shown in FIG. 9 is started on condition that the further vehicle VC2 is the same type as the subject vehicle VC1.

In a series of the processes shown in FIG. 9, the CPU 72 obtains the traveling performance index Idp2 of the further vehicle VC2 by executing the processes of S70 and S72 and then determines whether the comparison condition is satisfied (S74). If the comparison condition is satisfied (S74: YES), the CPU 72 executes the processes of S76 and S78. If the traveling performance of the subject vehicle VC1 is not lower than the traveling performance of the further vehicle VC2, that is, if the acceleration performance of the subject vehicle VC1 is not lower than the acceleration performance of the further vehicle VC2 (S78: NO), the CPU 72 sets the positive value α to a value α1 and sets the negative value β to a value β1 (S86). If the traveling performance of the subject vehicle VC1 is lower than the traveling performance of the further vehicle VC2, that is, if the acceleration performance of the subject vehicle VC1 is lower than the acceleration performance of the further vehicle VC2 (S78: YES), the CPU 72 sets the positive value α to a value α2 and sets the negative value β to a value β2 (S88). The values α1 and α2 are positive. The value α2 is greater than the value α1. The values 131 and 132 are negative. The absolute value of the value β2 is greater than the absolute value of the value β1. When the positive value α and the negative value β are set as described above, the CPU 72 temporarily ends the series of the processes shown in FIG. 9.

The present embodiment has the following advantages in addition to advantages (1), (2), (5), and (6) of the first embodiment.

(7) When it is determined that the acceleration performance of the subject vehicle VC1 is lower than the acceleration performance of the further vehicle VC2, the positive value α and the absolute value of the negative value β are each increased as compared to when it is determined that the acceleration performance of the subject vehicle VC1 is not lower than the acceleration performance of the further vehicle VC2. With this configuration, when it is determined that the acceleration performance of the subject vehicle VC1 is lower than the acceleration performance of the further vehicle VC2, the reward r assigned for the acceleration performance of the subject vehicle VC1 being higher than a reference performance is increased as compared to when it is determined that the acceleration performance of the subject vehicle VC1 is not lower than the acceleration performance of the further vehicle VC2. This increases the updating speed of the relationship specifying data DR, thereby adjusting the relationship between the state of the vehicle VC and the action variable in an earlier time. As a result, when the traveling performance of the subject vehicle VC1 is low due to the delay in updating the relationship specifying data DR, the acceleration performance of the subject vehicle VC1 is expected to be improved.

(8) The increase in the reward r as described above allows the relationship between the state of the vehicle VC and the action variable to be adjusted in an earlier time, so that the acceleration performance of the subject vehicle VC1 is increased. When the subject vehicle VC1 has the increased acceleration performance, whether the acceleration performance of the subject vehicle VC1 is lower than the acceleration performance of the further vehicle VC2 may be determined again based on information obtained through vehicle-to-vehicle communication. At this time, when the acceleration performance of the subject vehicle VC1 is not lower than the acceleration performance of the further vehicle VC2, the state that assigns the greater value (i.e., value α2) as the reward r is cancelled. That is, the positive value α is set back to the value α1, the negative value β is set back to the value β1. This limits excessive updates of the relationship specifying data DR.

Third Embodiment

A third embodiment will be described below with reference to the drawings. The differences from the first embodiment will mainly be discussed.

In the present embodiment, the traveling performance refers to an energy usage efficiency of the vehicle VC. That is, the traveling performance index Idp that is derived in the present embodiment is an index related to the energy usage efficiency of the vehicle VC.

In general, when the vehicle VC is operated in a manner that quickly decreases the torque Trq of the internal combustion engine 10, the energy usage efficiency of the vehicle VC is decreased. That is, the fuel efficiency is decreased. Therefore, when the torque Trq of the internal combustion engine 10 changes in accordance with changes in the accelerator operation amount PA, a vehicle VC in which the torque Trq changes slowly has a higher energy usage efficiency than a vehicle VC in which the torque Trq changes quickly. For example, the relationship between a change in the accelerator operation amount PA and a change in the torque Trq of the internal combustion engine 10 is derived as the traveling performance index Idp. More specifically, the increase rate change ratio CRtd may be derived as the traveling performance index Idp. In this case, in a vehicle VS having a high energy usage efficiency, the increase rate change ratio CRtd is likely to be lower than in a vehicle VC that does not have a high energy usage efficiency.

The updating process executed in the present embodiment will now be described with reference to FIG. 4.

In a series of the processes shown in FIG. 4, in the same manner as the first embodiment, the CPU 72 obtains time series data including a set of three sampling values that are the torque instruction value Trq*, the torque Trq, and the acceleration rate Gx in the episode that was most recently completed, and time series data of the state s and the action a (S30). The CPU 72 determines whether the logical conjunction of conditions (A) and (B) is true (S32). Condition (A) is that the absolute value of a difference between any torque Trq and the torque instruction value Trq* in the most recent period is less than or equal to a specified amount ΔTrq. Condition (B) is that the acceleration rate Gx is greater than or equal to a lower limit value G×L and less than or equal to an upper limit value G×H.

In the same manner as the first embodiment, the CPU 72 variably sets the lower limit value G×L in accordance with the change amount ΔPA of the accelerator operation amount PA at the time of starting the episode. That is, when the episode is related to the transition state and the change amount ΔPA is a positive value, the CPU 72 sets the lower limit value G×L to a greater value than when the episode is related to the steady state. When the episode is related to the transition state and the change amount ΔPA is a negative value, the CPU 72 sets the lower limit value G×L to a smaller value than when the episode is related to the steady state.

In the same manner as the first embodiment, the CPU 72 variable sets the upper limit value G×H in accordance with the change amount ΔPA of the accelerator operation amount PA per unit time at the time of starting an episode. That is, when the episode is related to the transition state and the change amount ΔPA is a positive value, the CPU 72 sets the upper limit value G×H to a greater value than when the episode is related to the steady state. When the episode is related to the transition state and the change amount ΔPA is a negative value, the CPU 72 sets the upper limit value G×H to a smaller value than when the episode is related to the steady state.

In the first embodiment, the traveling performance index Idp is derived as the index related to the acceleration performance of the vehicle VC. Instead, in the present embodiment, the traveling performance index Idp is derived as the index related to the energy usage efficiency of the vehicle VC. Therefore, the lower limit value G×L and the upper limit value G×H are set so that the difference between the lower limit value G×L and the upper limit value G×H is decreased from that of the first embodiment. This narrows the range of the acceleration rate Gx in which an affirmative determination is made in S32.

If it is determined that the logical conjunction is true (S32: YES), the CPU 72 assigns a positive value α to the reward r (S34). If it is determined that the logical conjunction is false (S32: NO), the CPU 72 assigns a negative value β to the reward r (S36). After executing the processes of S38 to S44, the CPU 72 temporarily ends the series of processes shown in FIG. 4.

The present embodiment has the following advantages in addition to advantages (2) and (4) to (6) of the first embodiment.

(9) When the further vehicle VC2 is the same type as the subject vehicle VC1 and is traveling in a range that allows for vehicle-to-vehicle communication with the subject vehicle VC1, the controller 70 of the subject vehicle VC1 performs vehicle-to-vehicle communication with the further vehicle VC2. That is, in the present embodiment, vehicle-to-vehicle communication is performed between two vehicles that are presumably traveling in the same traveling environment. The traveling environment includes, for example, a value μ of a road surface on which the vehicle VC travels, the gradient of the road surface, and the weather.

In the present embodiment, when the subject vehicle VC1 receives the traveling performance index Idp2 from the further vehicle VC2 traveling in the same traveling environment through vehicle-to-vehicle communication, the traveling performance index Idp1 of the subject vehicle VC1 is compared with the traveling performance index Idp2 of the further vehicle VC2 to determine whether the energy usage efficiency of the subject vehicle VC1 is lower than the energy usage efficiency of the further vehicle VC2. When the traveling performance index Idp2 of the further vehicle VC2 is compared with the traveling performance index Idp1 of the subject vehicle VC1 in the same traveling environment, determination is made taking into consideration the traveling environment of the subject vehicle VC1.

(10) When it is determined that the energy usage efficiency of the subject vehicle VC1 is lower than the energy usage efficiency of the further vehicle VC2 based on the comparison of the traveling performance index Idp2 of the further vehicle VC2 with the traveling performance index Idp1 of the subject vehicle VC1, there is a possibility that adjustment of the relationship between the state of the vehicle and the action variable is delayed in the subject vehicle VC1 as compared to the further vehicle VC2. That is, there is a possibility that the updating of the relationship specifying data DR in the subject vehicle VC1 is delayed as compared to the further vehicle VC2. In the present embodiment, when it is determined that the energy usage efficiency of the subject vehicle VC1 is lower than the energy usage efficiency of the further vehicle VC2, the relationship specifying data DR stored in the storage device 76 of the subject vehicle VC1 is replaced with the relationship specifying data DR used in the further vehicle VC2. As a result, when the traveling performance of the subject vehicle VC1 is low due to the delay in updating the relationship specifying data DR, the energy usage efficiency of the subject vehicle VC1 is improved as compared to before the replacement of the relationship specifying data DR.

Fourth Embodiment

A fourth embodiment will be described below with reference to the drawings. The differences from the second embodiment will mainly be discussed.

The procedures of a process executed by the controller 70 for determining whether the energy usage efficiency of the subject vehicle VC1 is lower than the energy usage efficiency of the further vehicle VC2 will be described with reference to FIG. 9.

In a series of the processes shown in FIG. 9, the CPU 72 obtains the traveling performance index Idp2 of the further vehicle VC2 by executing the processes of S70 and S72 and then determines whether the comparison condition is satisfied (S74). If the comparison condition is satisfied (S74: YES), the CPU 72 executes the processes of S76 and S78. If the traveling performance of the subject vehicle VC1 is not lower than the traveling performance of the further vehicle VC2, that is, if the energy usage efficiency of the subject vehicle VC1 is not lower than the energy usage efficiency of the further vehicle VC2 (S78: NO), the CPU 72 sets the positive value α to a value α1 and sets the negative value β to a value β1 (S86). If the traveling performance of the subject vehicle VC1 is lower than the traveling performance of the further vehicle VC2, that is, if the energy usage efficiency of the subject vehicle VC1 is lower than the energy usage efficiency of the further vehicle VC2 (S78: YES), the CPU 72 sets the positive value α to a value α2 and sets the negative value β to a value β2 (S88). The values α1 and α2 are positive. The value α2 is greater than the value α1. The values 131 and 132 are negative. The absolute value of the value β2 is greater than the absolute value of the value β1. When the positive value α and the negative value β are set as described above, the CPU 72 temporarily ends the series of the processes shown in FIG. 9.

The present embodiment has the following advantages in addition to advantages (2), (5), (6) and (9) of the first embodiment.

(11) When it is determined that the energy usage efficiency of the subject vehicle VC1 is lower than the energy usage efficiency of the further vehicle VC2, the positive value α and the absolute value of the negative value β are each increased as compared to when it is determined that the energy usage efficiency of the subject vehicle VC1 is not lower than the energy usage efficiency of the further vehicle VC2. With this configuration, when it is determined that the traveling performance of the subject vehicle VC1 is lower than the traveling performance of the further vehicle VC2, the reward r that is assigned when the energy usage efficiency of the subject vehicle VC1 is higher than a reference performance is increased as compared to when it is determined that the energy usage efficiency of the subject vehicle VC1 is not lower than the energy usage efficiency of the further vehicle VC2. This increases the updating speed of the relationship specifying data DR, thereby adjusting the relationship between the state of the vehicle VC and the action variable in an earlier time. As a result, when the traveling performance of the subject vehicle VC1 is low due to the delay in updating the relationship specifying data DR, the energy usage efficiency of the subject vehicle VC1 is expected to be improved.

(12) The increase in the reward r described above allows the relationship between the state of the vehicle VC and the action variable to be adjusted in an earlier time, so that the energy usage efficiency of the subject vehicle VC1 is increased. At the increased energy usage efficiency of the subject vehicle VC1, whether the energy usage efficiency of the subject vehicle VC1 is lower than the energy usage efficiency of the further vehicle VC2 may be determined again based on information obtained through vehicle-to-vehicle communication. In this case, when the energy usage efficiency of the subject vehicle VC1 is not lower than the energy usage efficiency of the further vehicle VC2, a state in which the greater value (i.e., value α2) is assigned as the reward r is cancelled. That is, the positive value α is set back to the value α1, the negative value β is set back to the value β1. This limits excessive updates of the relationship specifying data DR.

Correspondence Relationship

Correspondence relationship between the items in the embodiments described above and the items described in "Summary" is as follows. Hereinafter, the correspondence relationship is shown with each number of the aspects described in "Summary."

[1 to 10] The execution device, that is, the processing circuitry, corresponds to the CPU 72 and the ROM 74 shown in FIG. 1. The storage device corresponds to the storage device 76 shown in FIG. 1. The index deriving process corresponds to S50 shown in FIG. 5. The index receiving process corresponds to S70 and S72 shown in FIG. 7. The performance determination process corresponds to S76 and S78 shown in FIGS. 7 and 9. The obtaining process corresponds to S10 and S16 shown in FIG. 3. The operating process corresponds to S16 shown in FIG. 3. The reward calculation process corresponds to S32 to S36 shown in FIG. 4. The updating process corresponds to S38 to S44 shown in FIG. 4. The update mapping corresponds to a mapping specified by an instruction to execute the processes of S38 to S44 in the learning program 74*b*. The data replacement process corresponds to S84 shown in FIG. 7. The abnormality notification process corresponds to S92 shown in FIG. 8. The load amount obtaining process corresponds to S52 shown in FIG. 5. The load amount receiving process corresponds to S62 shown in FIG. 6 when receiving a request for transmission of the estimation value of the vehicle load amount in S70 shown in FIG. 7. The travel distance obtaining process corresponds to S54 in FIG. 5. The travel distance receiving process corresponds to S62 shown in FIG. 6 when receiving a request for transmission of the travel distance in S70 shown in FIG. 7.

Modified Examples

The embodiments may be modified as follows. The embodiment and the following modified examples can be combined as long as the combined modified examples remain technically consistent with each other.

Abnormality Notification Process

The abnormality notification process may be a process that notifies the sales company or the factory of the vehicle that the vehicle VC has an abnormality. For example, the controller 70 transmits a signal indicating that there is an abnormality from the communication unit 77 to the server of the sales company or the factory. At this time, the controller 70 may also transmit information that identifies the subject vehicle VC1. This allows the sales company or the factory to identify the vehicle VC possibly having an abnormality and prompt the owner of the vehicle VC to bring the vehicle VC to the sales company or the factory.

In the first and third embodiments, when it is determined that the traveling performance of the subject vehicle VC1 is not improved despite the replacement of the relationship specifying data DR stored in the storage device 76 of the subject vehicle VC1 with the relationship specifying data DR of the further vehicle VC2, the abnormality notification process is executed. Instead, the abnormality notification process may be configured not to be executed after the replacement of the relationship specifying data DR of the subject vehicle VC1 with the relationship specifying data DR of the further vehicle VC2 regardless of the determination result of whether the traveling performance of the subject vehicle VC1 is improved. When the abnormality notification process is not executed as described above, the determination of whether the traveling performance of the subject vehicle VC1 is improved does not have to be performed.

When the performance determination process determines that the traveling performance of the subject vehicle VC1 is lower than the traveling performance of the further vehicle VC2, the abnormality notification process may be executed instead of replacing the relationship specifying data DR or changing the process that assigns the reward r.

Comparison Condition (S74)

The comparison condition may include a condition other than the condition that the difference ΔLC between the estimation value LC1 of the vehicle load amount of the subject vehicle VC1 and the estimation value LC2 of the vehicle load amount of the further vehicle VC2 is less than the load amount difference determination value ΔLCTh and the condition that the difference ΔMil between the travel distance Mil1 of the subject vehicle VC1 and the travel distance Mil2 of the further vehicle VC2 is less than the distance difference determination value ΔMilTh. For example, the comparison condition may further include a condition that the subject vehicle VC1 and the further vehicle VC2 travel in the same direction. For example, the comparison condition may further include a condition that the difference between the properties of fuel used in the subject vehicle VC1 and the properties of fuel used in the further vehicle VC2 is in an allowable range.

As long as the comparison condition includes the condition that the difference ΔLC between the estimation value LC1 of the vehicle load amount of the subject vehicle VC1 and the estimation value LC2 of the vehicle load amount of the further vehicle VC2 is less than the load amount difference determination value ΔLCTh, the condition that the difference ΔMil between the travel distance Mil1 of the subject vehicle VC1 and the travel distance Mil2 of the further vehicle VC2 is less than the distance difference determination value ΔMilTh may be omitted from the comparison condition.

As long as the comparison condition includes the condition that the difference ΔMil between the travel distance Mil1 of the subject vehicle VC1 and the travel distance Mil2 of the further vehicle VC2 is less than the distance difference determination value ΔMilTh, the condition that the difference ΔLC between the estimation value LC1 of the vehicle load amount of the subject vehicle VC1 and the estimation value LC2 of the vehicle load amount of the further vehicle VC2 is less than the load amount difference determination value ΔLCTh may be omitted from the comparison condition.

The determination of S74 may be omitted from the processes shown in FIGS. 7 and 9. That is, when the traveling performance index Idp2 is received from the further vehicle VC2, the traveling performance index Idp1 of the subject vehicle VC1 may be compared with the traveling performance index Idp2 of the further vehicle VC2 regardless of whether the comparison condition is satisfied.

Traveling Performance Index

In the first and second embodiments, the index related to the acceleration performance of the vehicle VC is derived as the traveling performance index Idp. In this case, data that differs from the increase rate change ratio CRtd described in the first and second embodiments may be derived as the traveling performance index Idp, as long as the data shows the acceleration performance of the vehicle VC.

In the third and fourth embodiments, the index related to the energy usage efficiency of the vehicle VC is derived as the traveling performance index Idp. In this case, data different from the increase rate change ratio CRtd described in the third and fourth embodiments may be derived as the traveling performance index Idp, as long as the data shows the energy usage efficiency of the vehicle VC.

Vehicle Traveling Performance

The traveling performance of the vehicle VC may be a property different from the acceleration performance and the energy usage efficiency of the vehicle VS. For example, the emission property of the vehicle VC may be used as the traveling performance. In this case, in the index deriving process, an index related to the emission property is derived as the traveling performance index Idp. Then, in the comparison determination process, the index related to the emission property of the subject vehicle VC1 is compared with the index related to the emission property of the further vehicle VC2 to determine whether the emission property of the subject vehicle VC1 is lower than the emission property of the further vehicle VC2.

Dimensionality Reduction of Tabular Data

A process for reducing the dimensions of tabular data is not limited to that described in the embodiments. For example, since the accelerator operation amount PA rarely reaches the maximum value, the action value function Q may be configured not to be defined for a state in which the accelerator operation amount PA is greater than or equal to the specified amount. The throttle opening degree instruction value TA* and the like may be separately adapted for the state in which the accelerator operation amount PA is greater than or equal to the specified amount. For example, the dimensions may be reduced by omitting values from possible values of the action corresponding to the throttle opening degree instruction value TA* being greater than or equal to a specified value.

Relationship Specifying Data

In the embodiments, the action value function Q is of a table-type. However, there is not limitation to such a configuration. For example, a function approximator may be used.

For example, instead of using the action value function Q, the policy π may be expressed by a function approximator in which the state s and the action a are independent variables and the probability of the action a is a dependent variable. A parameter that determines the function approximator may be updated in accordance with the reward r.

Operating Process

For example, as described in "Relationship Specifying Data," when the action value function is a function approximator, the action a that maximizes the action value function Q may be specified by inputting the state s and all combinations of discrete values of the action used as an independent variable of the table-type function in the embodiments into the action value function Q. In this case, for example, while using mainly the specified action a for operation, other actions may be selected at a predetermined probability.

For example, as described in "Relationship Specifying Data," when the policy π is a function approximator in which the state s and the action a are independent variables and the probability of the action a is a dependent variable, the action a may be selected based on the probability shown by the policy π.

Update Mapping

In the processes of S38 to S44, an ε-soft on-policy Monte Carlo method is used. However, there is no limitation to such a configuration. For example, an off-policy Monte Carlo method may be used. Moreover, there is no limitation to a Monte Carlo method. For example, an off-policy temporal difference (TD) method may be used. An on-policy TD method such as a state-action-reward-state-action (SARSA) method may be used. An eligibility trace method may be used as on-policy learning.

For example, as described in "Relationship Specifying Data," the policy π may be expressed using a function approximator. When the policy π is directly updated based on the reward r, a policy gradient method may be used to configure the update mapping.

The subject that is directly updated by the reward r is not limited to only one of the action value function Q and the policy π. For example, as an actor-critic method, each of the action value function Q and the policy π may be updated. Further, in the actor-critic method, for example, a value function V may be updated instead of the action value function Q.

In the embodiments described above, the electronic device is operated using the relationship specifying data based on the update mapping obtained through reinforcement learning. However, the vehicle controller may be used for a vehicle that operates an electronic device without using such relationship specifying data as long as the vehicle is configured to learn a parameter related to the traveling performance of the vehicle based on information obtained as the vehicle travels.

Action Variable

In the embodiments described above, the throttle opening degree instruction value TA* is used as the action variable related to the opening degree of the throttle valve. However, there is no limitation to such a configuration. For example, the responsiveness of the throttle opening degree instruction value TA* to the accelerator operation amount PA may be expressed in a waste time and a secondary delay filter. Two variables specifying the waste time and the secondary delay filter may be added, and the three variables may be used as the variables related to the opening degree of the throttle valve. In this case, the state variable may be an amount of change in the accelerator operation amount PA per unit time instead of the time series data of the accelerator operation amount PA.

In the embodiments described above, the variable related to the opening degree of the throttle valve is used as the action variables. However, there is no limitation to such a configuration. For example, a variable related to ignition timing, a variable related to air-fuel ratio control, and the transmission ratio of the transmission 50 may be used in addition to the variable related to the opening degree of the throttle valve.

As described below in "Internal Combustion Engine," when the internal combustion engine is of a compression ignition type, a variable related to an injection amount may be used instead of the variable related to the opening degree of the throttle valve. In addition, for example, a variable related to injection timing, a variable related to the number of injections performed in one combustion cycle and a variable related to a time interval between the end time and the start time of two fuel injections for one cylinder that are adjacent on a time-series basis in one combustion cycle may be used.

For example, when the transmission 50 is a multi-speed transmission, the action variable may include a current value of a solenoid valve that hydraulically adjusts the engagement state of a clutch.

As described below in "Electronic Device," when a subject of operation corresponding to an action variable includes a rotary electric machine, the action variable may include torque or electric current of a rotary electric machine. More specifically, a load variable, which is a variable related to load of a propulsive force generator, may be torque or electric current of the rotary electric machine instead of the variable related to the opening degree of the throttle valve and the injection amount.

As described below in "Electronic Device," when a subject of operation corresponding to an action variable includes the lock-up clutch 42, the action variable may include a variable indicating an engagement state of the lock-up clutch 42.

State

In the embodiments described above, the time series data of the accelerator operation amount PA has six values that are sampled at equal intervals. However, there is no limitation to such a configuration. The data may have two or more sampling values that are obtained at different sampling timings. In this case, the data may have three or more sampling values or may be sampled at equal intervals.

The state variable related to the accelerator operation amount is not limited to the time series data of the accelerator operation amount PA and may be, for example, an amount of change in the accelerator operation amount PA per unit time as described in "Action Variable."

For example, as described in "Action Variable," when the action variable includes a current value of a solenoid valve, the state may include rotation speed of the input shaft 52 of the transmission, rotation speed of the output shaft 54, and hydraulic pressure adjusted by the solenoid valve. For example, as described in "Action Variable," when the action variable includes torque or output of a rotary electric machine, the state may include the state of charge and the temperature of the battery. For example, as described in "Action Variable," when the action includes a load torque of a compressor or consumed power of an air conditioner, the state may include the temperature of the vehicle interior.

Electronic Device

The electronic device of the internal combustion engine that is operated in accordance with the action variable is not limited to the throttle valve 14. For example, the ignition device 26 or the fuel injection valve 16 may be used as the electronic device.

The electronic device that is operated in accordance with the action variable may be a drivetrain device arranged between the propulsive force generator and the drive wheels. In this case, the transmission 50 or the lock-up clutch 42 may be the electronic device that is operated in accordance with the action variable.

When the transmission 50 is used as the electronic device that is operated in accordance with the action variable, the relationship specifying data DR may be updated so that a greater value is likely to be selected as the transmission ratio of the transmission 50, that is, a lower speed stage is likely to be selected as the speed stage, to increase the acceleration performance of the vehicle VC. Instead, to increase the energy usage efficiency of the vehicle VC, the relationship specifying data DR may be updated so that a smaller value is likely to be selected as the transmission ratio of the transmission 50, that is, a higher speed stage is likely to be selected as the speed stage.

When the lock-up clutch 42 is used as the electronic device that is operated in accordance with the action variable, the relationship specifying data DR may be updated so that the lock-up clutch 42 enters the engaged state from when the vehicle is at a lower speed to increase the energy usage efficiency of the vehicle VC.

As described below in "Vehicle," when the vehicle includes a rotary electric machine as the propulsive force generator, the electronic device operated in accordance with the action variable may be a power conversion circuit such as an inverter connected to the rotary electric machine. The electronic device is not limited to one in the on-board drivetrain and may be, for example, an on-board air conditioner. In this case, for example, when the on-board air conditioner is driven by rotational drive force of the propulsive force generator, part of drive force of the propulsive force generator is supplied to the drive wheels 60. Since the part of drive force is dependent on a load torque of the on-board air conditioner, including the action variable in the load torque of the on-board air conditioner is also advantageous. In addition, for example, even when the on-board air conditioner is configured not to use rotational drive force of the propulsive force generator, the energy usage efficiency is still affected. Adding consumption power of the on-board air conditioner to the action variable is advantageous.

Vehicle Control Program

In the embodiments described above, the CPU 72 executes the control program 74*a* and the learning program 74*b* stored in the ROM 74 of the controller 70 to compare the traveling performance of the subject vehicle VC1 with the traveling performance of the further vehicle VC2. However, the vehicle control program including various processes used to perform the above comparison does not necessarily have to be stored in the ROM 74 in advance. For example, the owner of the vehicle VC may instruct that the vehicle control program be installed in the controller 70 from a server arranged outside the vehicle. In this case, the vehicle control program is stored in a nonvolatile memory of the controller 70. The CPU 72 executes the vehicle control program stored in the nonvolatile memory. This obtains the same advantages as those of the embodiments. The vehicle control program may be stored in a non-transitory computer readable medium.

Execution Device

The execution device is not limited to a device that includes the CPU 72 and the ROM 74 and executes the software processes. For example, a dedicated hardware circuit such as an ASIC may be provided that executes at least part of the software processing executed in the embodiments. More specifically, the execution device may have any one of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with the programs and a dedicated hardware circuit that executes the remaining processes. Configuration (c) includes a dedicated hardware circuit that executes all of the above-described processes. Multiple software execution devices each including a processor and a program storage device and multiple dedicated hardware circuits may be provided. More specifically, the above-described processes may be executed by processing circuitry that includes at least one of one or more software execution devices or one or more dedicated hardware circuits. The program storage device, that is, a computer readable medium, includes any medium that can be accessed from a general-purpose computer or a dedicated computer.

Storage Device

In the embodiments, the storage device 76 that stores the relationship specifying data DR is different from the storage device (ROM 74) that stores the learning program 74*b* and the control program 74*a*.

Internal Combustion Engine

The internal combustion engine is not limited to one including a port injection valve that injects fuel into the intake passage 12 as a fuel injection valve and may be, for example, one including a direct injection valve that directly injects fuel into the combustion chamber 24 or one including both a port injection valve and a direct injection valve.

The internal combustion engine is not limited to a spark ignition type internal combustion engine and may be, for example, a compression ignition type internal combustion engine that uses, for example, light oil as fuel.

Vehicle

The vehicle is not limited to a vehicle that includes only an internal combustion engine as the propulsive force generator of the vehicle and may be, for example, a hybrid vehicle that includes both an internal combustion engine and a rotary electric machine. The vehicle may include, for example, only a rotary electric machine as the propulsive force generator such as an electric car or a fuel cell vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller used for a first vehicle, the first vehicle being configured to directly perform vehicle-to-vehicle communication with a second vehicle, the vehicle controller, comprising:

processing circuitry, the processing circuitry being configured to execute:

an index deriving process that derives a traveling performance index of the first vehicle, the traveling performance index of the first vehicle being an index related to a traveling performance of the first vehicle, an index receiving process that receives a traveling performance index of the second vehicle from the second vehicle through the vehicle-to-vehicle communication, the traveling performance index of the second vehicle being an index related to a traveling performance of the second vehicle, and a performance determination process that compares the traveling performance index of the second vehicle with the traveling performance index of the first vehicle to determine whether a traveling performance of the first vehicle is lower than a traveling performance of the second vehicle; and a memory configured to store relationship specifying data that specifies a relationship between a state of the first vehicle and an action variable, wherein the state of the first vehicle affects the traveling performance of the first vehicle indicated by the traveling performance index of the first vehicle, the action variable is a variable related to operation of an electronic device of the first vehicle, the electronic device of the first vehicle includes at least one of a throttle valve, a fuel injection valve, an ignition device, a lock-up clutch, a transmission, a power conversion circuit, and an air conditioner, the processing circuitry is configured to execute:

an obtaining process that obtains a detection value of a sensor configured to detect the state of the first vehicle, an operating process that operates the electronic device based on a value of the action variable that is determined by the detection value and the relationship specifying data, a reward calculation process that assigns a greater reward when the detection value indicates that the traveling performance of the first vehicle is higher than a reference performance than when the detection value indicates that the traveling performance of the first vehicle is not higher than the reference performance, and an updating process that updates the relationship specifying data using the detection value, the value of the action variable used for operation of the electronic device, and a reward corresponding to the operation as inputs to a predetermined update mapping, the update mapping is configured to output the relationship specifying data that is updated so that an expected return of the reward is increased when the electronic device is operated in accordance with the relationship specifying data, and the processing circuitry is configured to increase an update speed of the relationship specifying data that specifies the relationship between the state of the first vehicle and the action variable when the performance determination process determines that the traveling performance of the first vehicle is lower than the traveling performance of the second vehicle relative to when the performance determination process determines that the traveling performance of the first vehicle is not lower than the traveling performance of the second vehicle.

2. The vehicle controller according to claim 1, wherein the processing circuitry is configured to increase the update speed by, in the reward calculation process, setting a reward assigned for a value indicating that the traveling performance of the first vehicle is higher than the reference performance to a greater value when the performance determination process determines that the traveling performance of the first vehicle is lower than the traveling performance of the second vehicle than when the performance determination process determines that the traveling performance of the first vehicle is not lower than the traveling performance of the second vehicle.

3. The vehicle controller according to claim 1, wherein the processing circuitry is configured to execute a data replacement process that receives relationship specifying data from the second vehicle and replaces the relationship specifying data stored in the memory with the relationship specifying data received from the second vehicle when the performance determination process determines that the traveling performance of the first vehicle is lower than the traveling performance of the second vehicle.

4. The vehicle controller according to claim 3, wherein the processing circuitry is configured to execute an abnormality notification process that notifies that the first vehicle has an abnormality when the traveling performance of the first vehicle is not improved despite the replacement of the relationship specifying data stored in the memory with the relationship specifying data received from the second vehicle in the execution of the data replacement process.

5. The vehicle controller according to claim 1, wherein the processing circuitry is configured to:

derive an index related to an energy usage efficiency of the first vehicle as the traveling performance index of the first vehicle in the index deriving process, and determine whether the energy usage efficiency of the first vehicle is lower than an energy usage efficiency of the second vehicle in the performance determination process.

6. The vehicle controller according to claim 1, wherein the processing circuitry is configured to:

derive an index related to an acceleration performance of the first vehicle as the traveling performance index of the first vehicle in the index deriving process, and determine whether the acceleration performance of the first vehicle is lower than an acceleration performance of the second vehicle in the performance determination process.

7. The vehicle controller according to claim 1, wherein the processing circuitry is configured to execute:

a load amount obtaining process that obtains an estimation value of an amount of load on the first vehicle, and a load amount receiving process that receives an estimation value of an amount of load on the second vehicle through the vehicle-to-vehicle communication, and the processing circuitry is configured to execute the performance determination process on a condition that a difference between the estimation value of the amount of load on the second vehicle and the estimation value of the amount of load on the first vehicle is less than a load amount difference determination value.

8. The vehicle controller according to claim 1, wherein the processing circuitry is configured to execute:

a travel distance obtaining process that obtains a travel distance of the first vehicle, and a travel distance receiving process that receives a travel distance of the second vehicle through the vehicle-to-vehicle communication, and the processing circuitry is configured to execute the performance determination process on a condition that a difference between the travel distance of the second vehicle and the travel distance of the first vehicle is less than a distance difference determination value.

9. A vehicle controller used for a first vehicle, the first vehicle being configured to directly perform vehicle-to-vehicle communication with a second vehicle, the vehicle controller, comprising:

processing circuitry, the processing circuitry being configured to execute:

an index deriving process that derives a traveling performance index of the first vehicle, the traveling performance index of the first vehicle being an index related to a traveling performance of the first vehicle, an index receiving process that receives a traveling performance index of the second vehicle from the second vehicle through the vehicle-to-vehicle communication, the traveling performance index of the second vehicle being an index related to a traveling performance of the second vehicle, and a performance determination process that compares the traveling performance index of the second vehicle with the traveling performance index of the first vehicle to determine whether a traveling performance of the first vehicle is lower than a traveling performance of the second vehicle; and a memory configured to store relationship specifying data that specifies a relationship between a state of the first vehicle and an action variable, wherein the state of the first vehicle affects the traveling performance of the first vehicle indicated by the traveling performance index of the first vehicle, the action variable is a variable related to operation of an electronic device of the first vehicle, the electronic device of the first vehicle includes at least one of a throttle valve, a fuel injection valve, an ignition device, a lock-up clutch, a transmission, a power conversion circuit, and an air conditioner, the processing circuitry is configured to execute:

an obtaining process that obtains a detection value of a sensor configured to detect the state of the first vehicle, an operating process that operates the electronic device based on a value of the action variable that is determined by the detection value and the relationship specifying data, a reward calculation process that assigns a greater reward when the detection value indicates that the traveling performance of the first vehicle is higher than a reference performance than when the detection value indicates that the traveling performance of the first vehicle is not higher than the reference performance, an updating process that updates the relationship specifying data using the detection value, the value of the action variable used for operation of the electronic device, and a reward corresponding to the operation as inputs to a predetermined update mapping, and a data replacement process that:

when the performance determination process determines that the traveling performance of the first vehicle is lower than the traveling performance of the second vehicle:

requests relationship specifying data from the second vehicle, the relationship specifying data from the second vehicle specifying a relationship between a state of the second vehicle and the action variable, receives the relationship specifying data from the second vehicle, and replaces the relationship specifying data stored in the memory with the relationship specifying data received from the second vehicle, and when the performance determination process does not determine that the traveling performance of the first vehicle is lower than the traveling performance of the second vehicle:

does not request the relationship specifying data from the second vehicle, does not receive the relationship specifying data from the second vehicle, and does not replace the relationship specifying data stored in the memory with the relationship specifying data received from the second vehicle, and the update mapping is configured to output the relationship specifying data that is updated so that an expected return of the reward is increased when the electronic device is operated in accordance with the relationship specifying data.

10. The vehicle controller according to claim 9, wherein the processing circuitry is configured, in the reward calculation process, to set a reward assigned for a value indicating that the traveling performance of the first vehicle is higher than the reference performance to a greater value when the performance determination process determines that the traveling performance of the first vehicle is lower than the traveling performance of the second vehicle than when the performance determination process determines that the traveling performance of the first vehicle is not lower than the traveling performance of the second vehicle.

11. The vehicle controller according to claim 9, wherein the processing circuitry is configured to execute an abnormality notification process that notifies that the first vehicle has an abnormality when the traveling performance of the first vehicle is not improved despite the replacement of the relationship specifying data stored in the memory with the relationship specifying data received from the second vehicle in the execution of the data replacement process.

12. The vehicle controller according to claim 9, wherein the processing circuitry is configured to:

derive an index related to an energy usage efficiency of the first vehicle as the traveling performance index of the first vehicle in the index deriving process, and determine whether the energy usage efficiency of the first vehicle is lower than an energy usage efficiency of the second vehicle in the performance determination process.

13. The vehicle controller according to claim 9, wherein the processing circuitry is configured to:

derive an index related to an acceleration performance of the first vehicle as the traveling performance index of the first vehicle in the index deriving process, and determine whether the acceleration performance of the first vehicle is lower than an acceleration performance of the second vehicle in the performance determination process.

14. The vehicle controller according to claim 9, wherein the processing circuitry is configured to execute:

a load amount obtaining process that obtains an estimation value of an amount of load on the first vehicle, and a load amount receiving process that receives an estimation value of an amount of load on the second vehicle through the vehicle-to-vehicle communication, and the processing circuitry is configured to execute the performance determination process on a condition that a difference between the estimation value of the amount of load on the second vehicle and the estimation value of the amount of load on the first vehicle is less than a load amount difference determination value.

15. The vehicle controller according to claim 9, wherein the processing circuitry is configured to execute:

a travel distance obtaining process that obtains a travel distance of the first vehicle, and a travel distance receiving process that receives a travel distance of the second vehicle through the vehicle-to-vehicle communication, and the processing circuitry is configured to execute the performance determination process on a condition that a difference between the travel distance of the second vehicle and the travel distance of the first vehicle is less than a distance difference determination value.

* * * * *